(12) United States Patent
Li et al.

(10) Patent No.: US 8,817,208 B2
(45) Date of Patent: Aug. 26, 2014

(54) DISPLAY APPARATUS AND LIQUID CRYSTAL DISPLAY DEVICE

(75) Inventors: Wang-Yang Li, Tainan (TW); Ting-I Wu, Kaohsiung (TW)

(73) Assignee: Chi Mei Materials Technology Corporation, Tainan (TW)

( * ) Notice: Subject to any disclaimer, the term of this patent is extended or adjusted under 35 U.S.C. 154(b) by 127 days.

(21) Appl. No.: 13/433,703

(22) Filed: Mar. 29, 2012

(65) Prior Publication Data

US 2012/0249934 A1    Oct. 4, 2012

(30) Foreign Application Priority Data

Mar. 31, 2011  (TW) .............................. 100111497 A
Mar. 12, 2012  (TW) .............................. 101108364 A

(51) Int. Cl.
    *G02F 1/1335*    (2006.01)
(52) U.S. Cl.
    USPC .............................. 349/112; 349/201; 349/57
(58) Field of Classification Search
    USPC ........................................................ 349/112
    See application file for complete search history.

(56) References Cited

U.S. PATENT DOCUMENTS

| | | | |
|---|---|---|---|
| 6,483,612 B2 | 11/2002 | Walker | |
| 2003/0098933 A1* | 5/2003 | Suzuki et al. | 349/30 |
| 2009/0027606 A1* | 1/2009 | Nakanishi | 349/143 |
| 2009/0046367 A1* | 2/2009 | Kim et al. | 359/566 |
| 2009/0116125 A1* | 5/2009 | Kolesnychenko et al. | 359/735 |
| 2009/0195742 A1* | 8/2009 | Fu et al. | 349/128 |
| 2009/0213311 A1* | 8/2009 | Hisakado et al. | 349/117 |
| 2010/0085642 A1* | 4/2010 | Drinkwater | 359/567 |
| 2010/0219412 A1* | 9/2010 | Lee | 257/59 |
| 2010/0309098 A1* | 12/2010 | Kurashima et al. | 345/32 |

FOREIGN PATENT DOCUMENTS

| | | |
|---|---|---|
| EP | 0 567 995 | 11/1993 |
| JP | 2005-070632 | 3/2005 |
| WO | WO 96/22590 | 7/1996 |
| WO | WO 02/06858 | 1/2002 |

OTHER PUBLICATIONS

European Search Report dated Aug. 13, 2012.
English language translation of abstract of JP 2005-070632 (published Mar. 17, 2005).

* cited by examiner

*Primary Examiner* — Bumsuk Won
*Assistant Examiner* — Edmond Lau
(74) *Attorney, Agent, or Firm* — McClure, Qualey & Rodack, LLP

(57) ABSTRACT

A display apparatus and a liquid crystal display device are provided. The display apparatus comprises a display device for displaying an image and a diffractive optical element. The diffractive optical element comprises pixel unit regions. Each of the pixel unit regions has a long pixel side and a short pixel side adjacent to each other. The diffractive optical element is disposed on a light emitting side of the display device and comprises first grating regions and second grating regions. The first grating regions have a first diffraction grating. The second grating regions have a second diffraction grating. An azimuth angle of the first diffraction grating is different from an azimuth angle of the second diffraction grating.

27 Claims, 35 Drawing Sheets

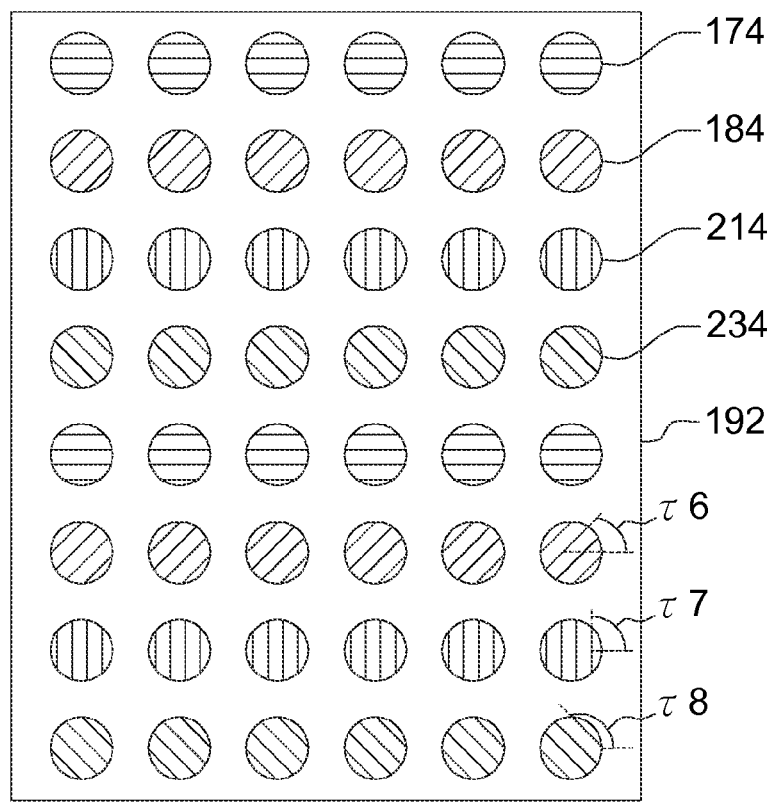
FIG. 11
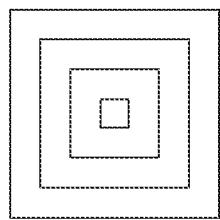  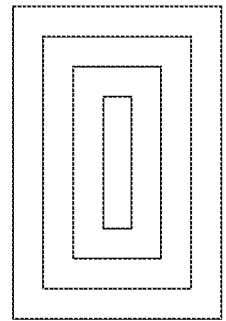
FIG. 12          FIG. 13

DISPLAY APPARATUS AND LIQUID CRYSTAL DISPLAY DEVICE

This application claims the benefits of Taiwan application Serial No. 100111497, filed Mar. 31, 2011, and 101108364, filed Mar. 12, 2012, the subject matters of which are incorporated herein by reference

BACKGROUND

1. Technical Field

The disclosure relates in general to a display apparatus and more particularly to a display apparatus having a diffractive optical element.

2. Description of the Related Art

Currently, an image display device mainly comprises a liquid crystal display device, a plasma display device, an OLED display device and an electronic paper display device, etc. The liquid crystal display device is a non-self-luminous display device, and thus usually needs a backlight source for generating light that entering the liquid crystal display panel with a uniform plane profile through an optical film such as a diffusion film, a brightener film, etc, for displaying an image.

J.P. patent application number 2003-302954, entitled "SPATIAL OPTICAL MODULATOR, AND PROJECTOR", has disclosed a projector having a projection image of high contrast, at low cost and with a simple construction. An spatial optical modulator having a pair of counter substrate and a TFT substrate and a liquid crystal interposed between the counter substrate and the TFT substrate and modulating incident light from the counter substrate side according to an image signal to emit the modulated light from the TFT substrate side has a wedge prism deflecting incident light to the light emission side of the TFT substrate.

EP. patent publication number 0567995A1, entitled "Image display apparatus", has disclosed an image display apparatus includes an image display device such as, a liquid crystal display panel having a plurality of dot-shaped picture elements arranged in a two-dimensional pattern, and a diffraction grating disposed on an optical path through which imagewise rays of light emerging from the device travel.

U.S. Pat. No. 6,483,612, entitled "Projection screen apparatus including holographic optical element", has disclosed a screen apparatus includes a holographic optical element and a diffuser. In operation, the holographic optical element receives image light from an image engine or projector and redirects the image light to the diffuser for scattering. The holographic optical element can be designed to substantially collimate, converge, or diverge the image light.

A twisted nematic (TN) or a super twisted nematic (STN) liquid crystal display device are types of the display devices usually used. Although this kind of the liquid crystal display device has advantage in price, the viewing angle of which is smaller than that of a ordinary wide viewing angle liquid crystal display device, such as a multi-domain vertical alignment (MVA) liquid crystal display device, an in-plane switching (IPS) liquid crystal display device, a fringe field switching (FFS) liquid crystal display device, etc.

The viewing angle means an angle range in which the display device can display an image quality of which is in a standard range. For example, for a general desktop liquid crystal display device, the main viewing angle is a front view. Therefore, for designers, the display device is designed according to the front view mainly since the optical effect would be affect due to the arrangement of the liquid crystal molecule. Therefore, an observer would find images of different colors and brightness with different oblique s to the liquid crystal display device. At the same time, the image difference increases as the viewing angle increases. Among the liquid crystal display devices usually used, the TN liquid crystal display device has the worst condition. For a TN liquid crystal display device without using any compensating element for viewing angle, usually, an image observed from the side viewing angle of the liquid crystal display device has problems such as serious contrast decreasing (to lower than 10), gray level reversion degrees, etc.

Therefore, a display apparatus for improving image quality problems such as contrast, gray level reversion, etc is need.

SUMMARY

A display apparatus is provided. The display apparatus comprises a liquid crystal display, a first polarizer, a second polarizer and a diffractive optical element. The liquid crystal display device comprises a backlight module and a liquid crystal panel. The liquid crystal panel comprises a first substrate, a second substrate and a liquid crystal layer. The liquid crystal layer is disposed between the first substrate and the second substrate. The first polarizer is disposed on the first substrate. The second polarizer is disposed between the second substrate and the backlight module. Polarizing directions of the first polarizer and the second polarizer have different azimuth angles. The diffractive optical element is disposed on a light emitting side of the first polarizer and has a first diffraction grating and a second diffraction grating. Grating directions of the first diffraction grating and the second diffraction grating have different azimuth angles.

A display apparatus is provided. The display apparatus comprises a liquid crystal display device for displaying an image and a diffractive optical element. The liquid crystal display device comprises a backlight module and a liquid crystal panel. The liquid crystal panel is disposed on the backlight module and comprises a first substrate, a first alignment film, a second substrate, a second alignment film, and a liquid crystal layer. The first alignment film is disposed on the first substrate. The second alignment film is disposed on the second substrate. Aligning directions of the first alignment film and the second alignment film have different azimuth angles. The liquid crystal layer is disposed between the first alignment film and the second alignment film. The diffractive optical element is disposed on a light emitting side of the liquid crystal display device and comprises a first diffraction grating and a second diffraction grating. An azimuth angle of a grating direction of the first diffraction grating is different from an azimuth angle of a grating direction of the second diffraction grating.

A liquid crystal display device for displaying an image is provided. The liquid crystal display device comprises a liquid crystal panel and a diffractive optical element. The liquid crystal panel comprises a first substrate, a second substrate and a liquid crystal layer. The liquid crystal layer is disposed between the first substrate and the second substrate. The liquid crystal layer comprises liquid crystal molecules. At least one of the liquid crystal molecules adjacent to the first substrate has a first liquid crystal tilt direction. At least one of the liquid crystal molecules adjacent to the second substrate has a second liquid crystal tilt direction. An azimuth angle of the first liquid crystal tilt direction is different from an azimuth angle of the second liquid crystal tilt direction. The diffractive optical element is disposed on a light emitting side of the liquid crystal panel and comprises a first diffraction grating and a second diffraction grating. An azimuth angle of a grating direction of the first diffraction grating is different from an azimuth angle of a grating direction of the second diffraction grating.

A display apparatus is provided. The display apparatus comprises a display device for displaying an image and a diffractive optical element. The diffractive optical element comprises pixel unit regions. Each of the pixel unit regions has a long pixel side and a short pixel side adjacent to each other. The diffractive optical element is disposed on a light emitting side of the display device and comprises first grating regions and second grating regions. The first grating regions have a first diffraction grating. The second grating regions have a second diffraction grating. An azimuth angle of the first diffraction grating is different from an azimuth angle of the second diffraction grating.

The above and other aspects of the disclosure will become better understood with regard to the following detailed description of the non-limiting embodiment(s). The following description is made with reference to the accompanying drawings.

BRIEF DESCRIPTION OF THE DRAWINGS

FIGS. 2-11 and 20-32 illustrate the diffractive optical elements in embodiments.

FIGS. 12-19 illustrate the grating regions of the diffractive optical elements in embodiments.

DETAILED DESCRIPTION

Figure 1:
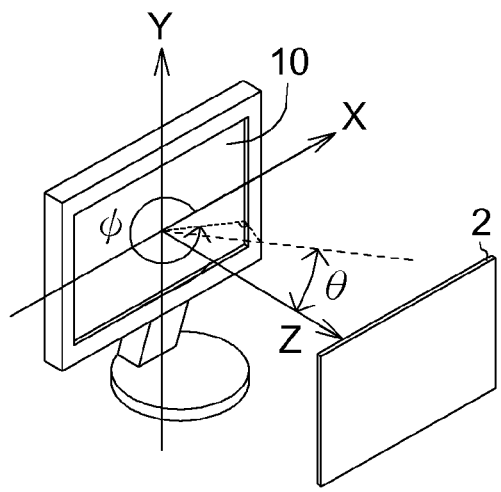
FIG. 1 illustrates a three dimensional diagram of the display apparatus according to one embodiment of the present invention.
Figure 33:
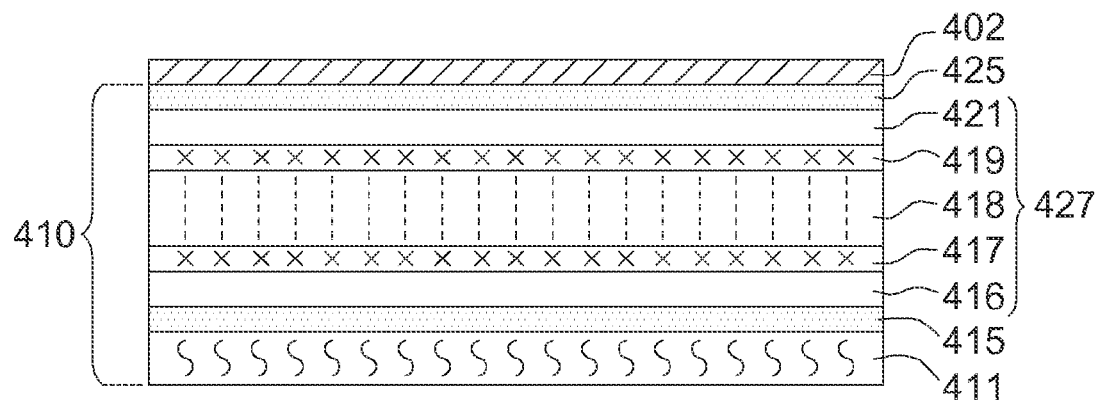
FIG. 33 illustrates a cross-section view of the display apparatus in one embodiment.
Figure 34:
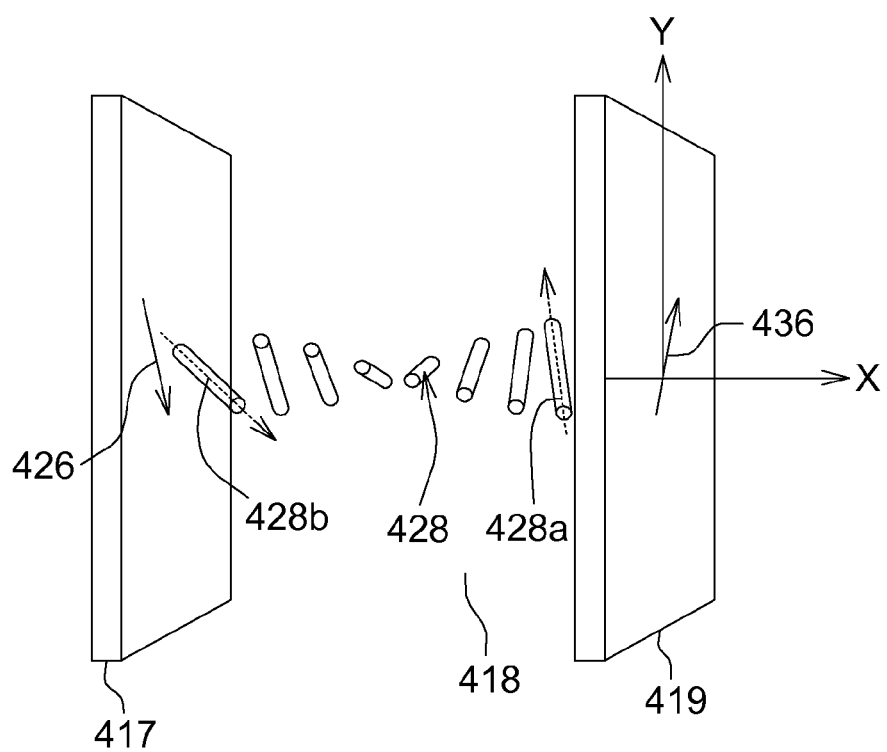
FIG. 34 illustrates a three dimensional diagram of the alignment film and the liquid crystal layer of the display device.
Figure 35:
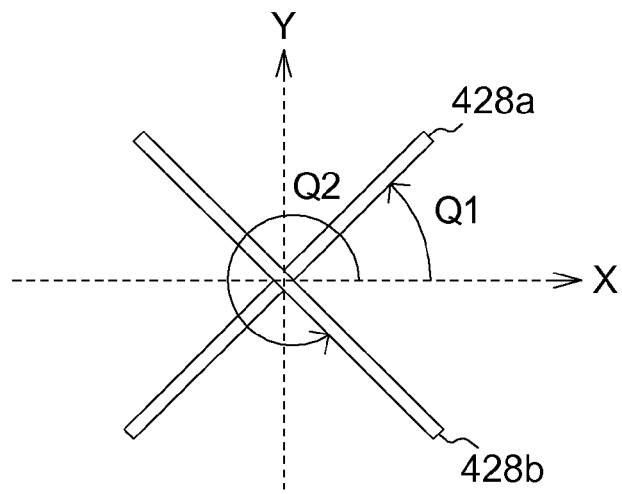
FIG. 35 illustrates the liquid crystal tilt azimuth angle of the liquid crystal molecule of the liquid crystal layer.
Figure 42:
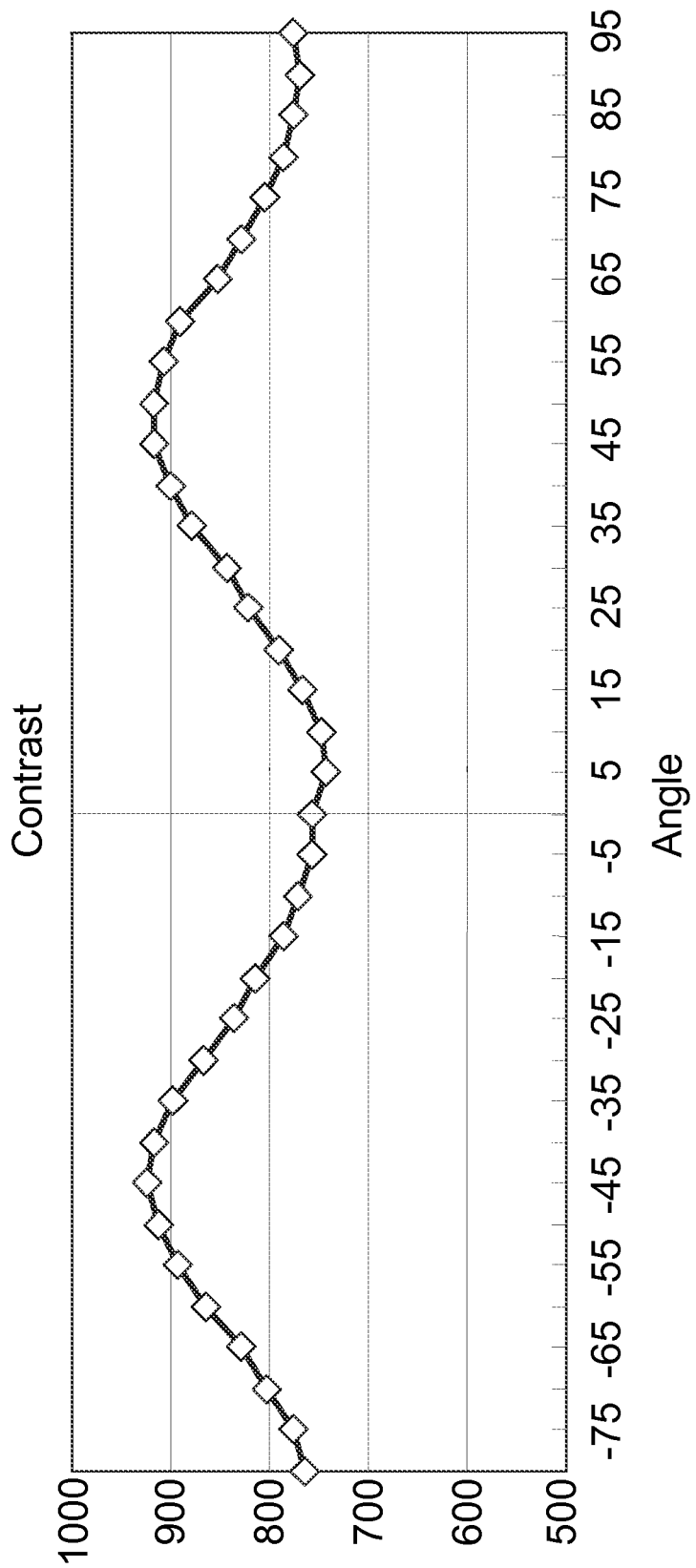
FIG. 42 illustrates the influence of the diffractive optical element having the diffraction gratings of two kinds of the azimuth angles to the contrast.
Figure 43:
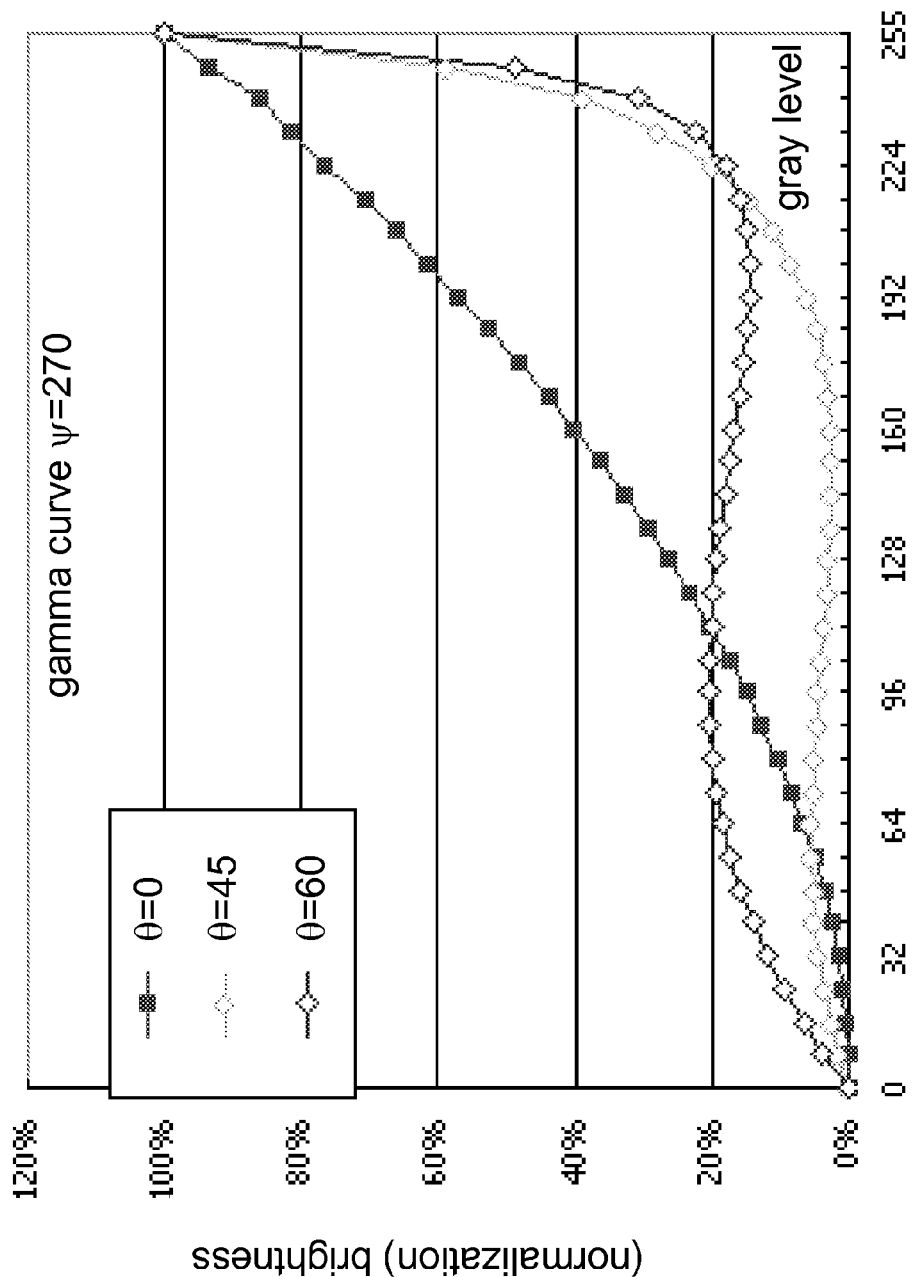
FIG. 43 illustrates gamma curves of the display apparatus without using the diffractive optical element (comparative example) from the front view (zenith angle of 0 degree) and the side viewing angles (zenith angles of 45 degrees and 60 degrees).
Figure 44:
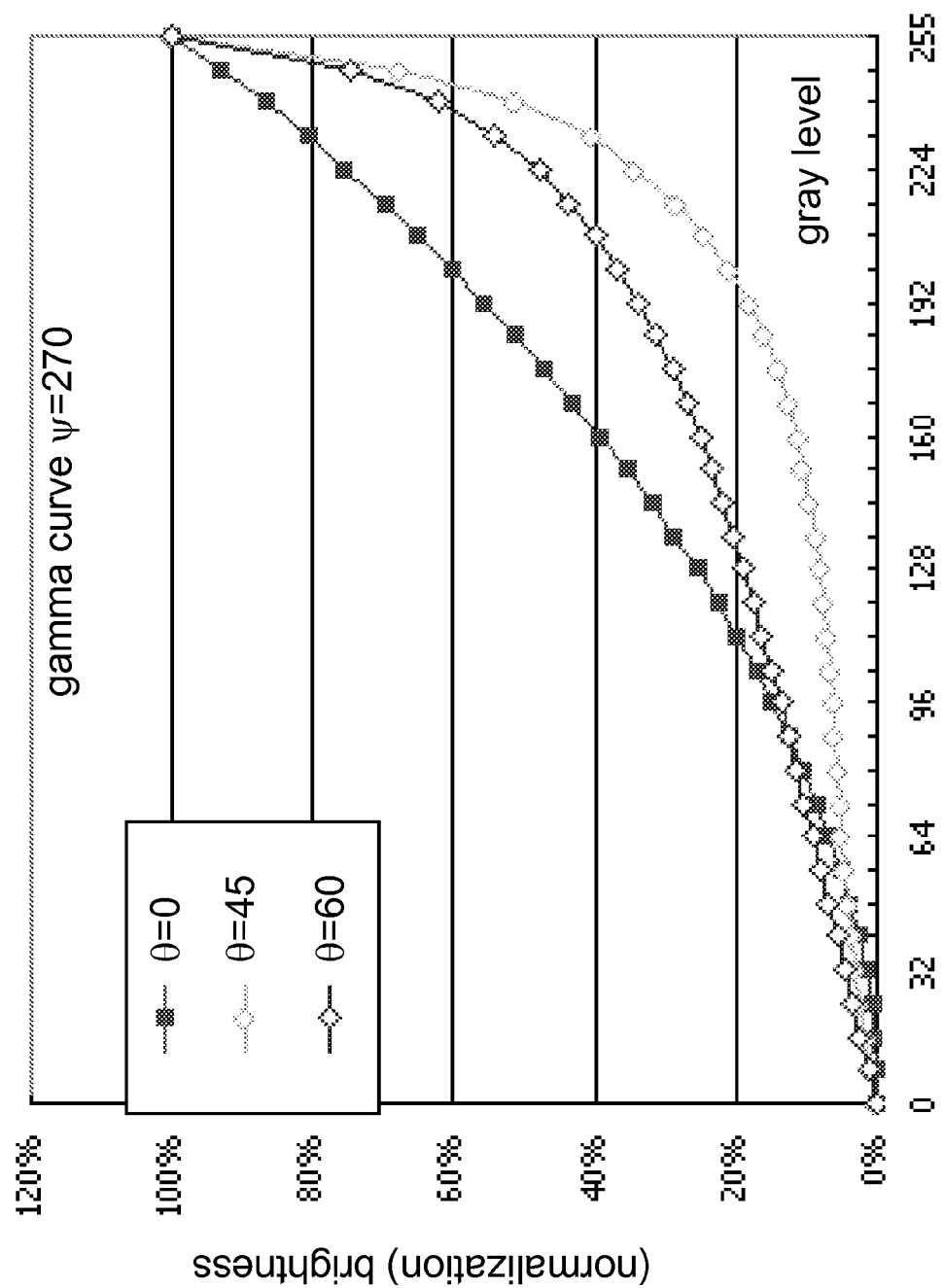
FIG. 44 illustrates gamma curves of the display apparatus with using the diffractive optical element from the front view (zenith angle of 0 degree) and the side viewing angles (zenith angles of 45 degrees and 60 degrees).
Figure 45:
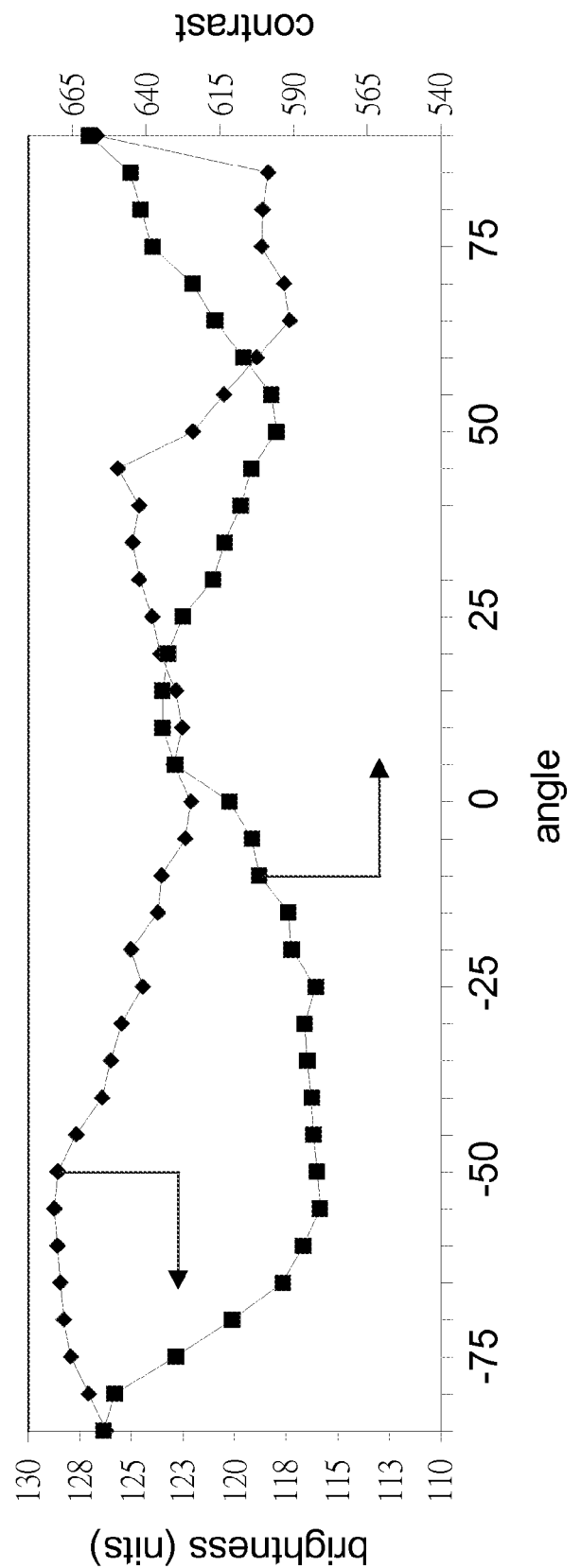
FIG. 45 illustrates the influence of the diffractive optical element having the diffraction gratings of three kinds of the azimuth angles to the contrast and the brightness white state.
Figure 46:
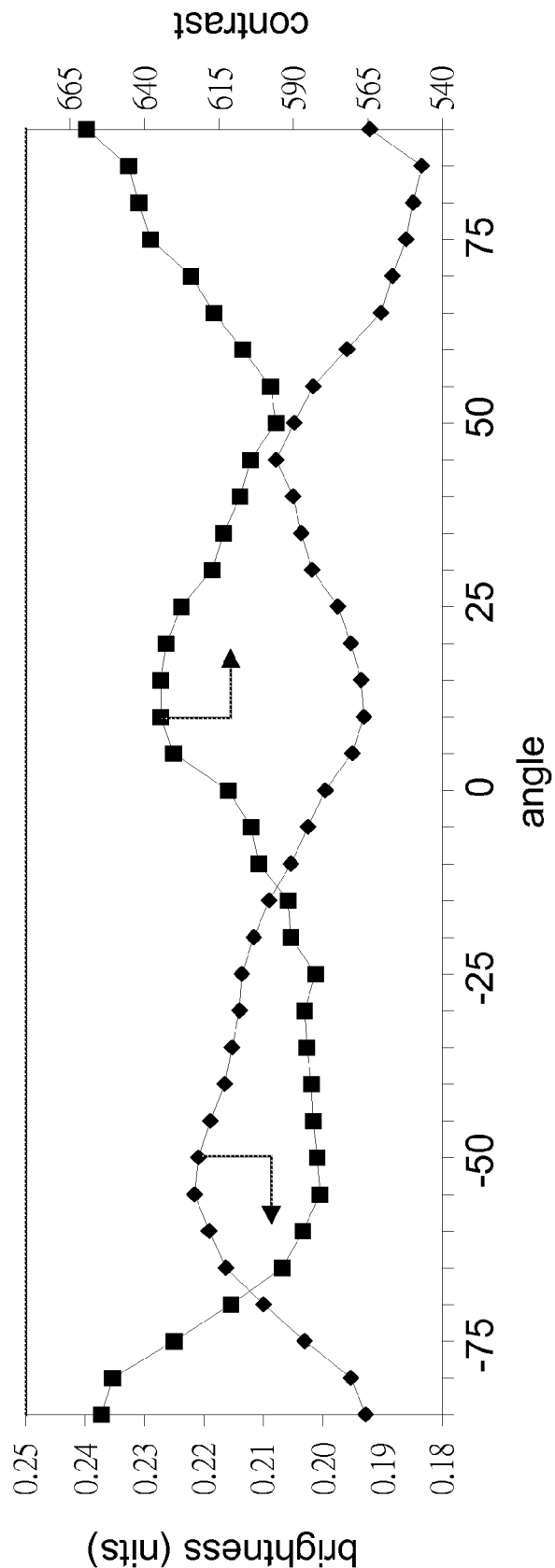
FIG. 46 illustrates the influence of the diffractive optical element having the diffraction gratings of three kinds of the azimuth angles to the contrast and the brightness black state.
Figure 47:
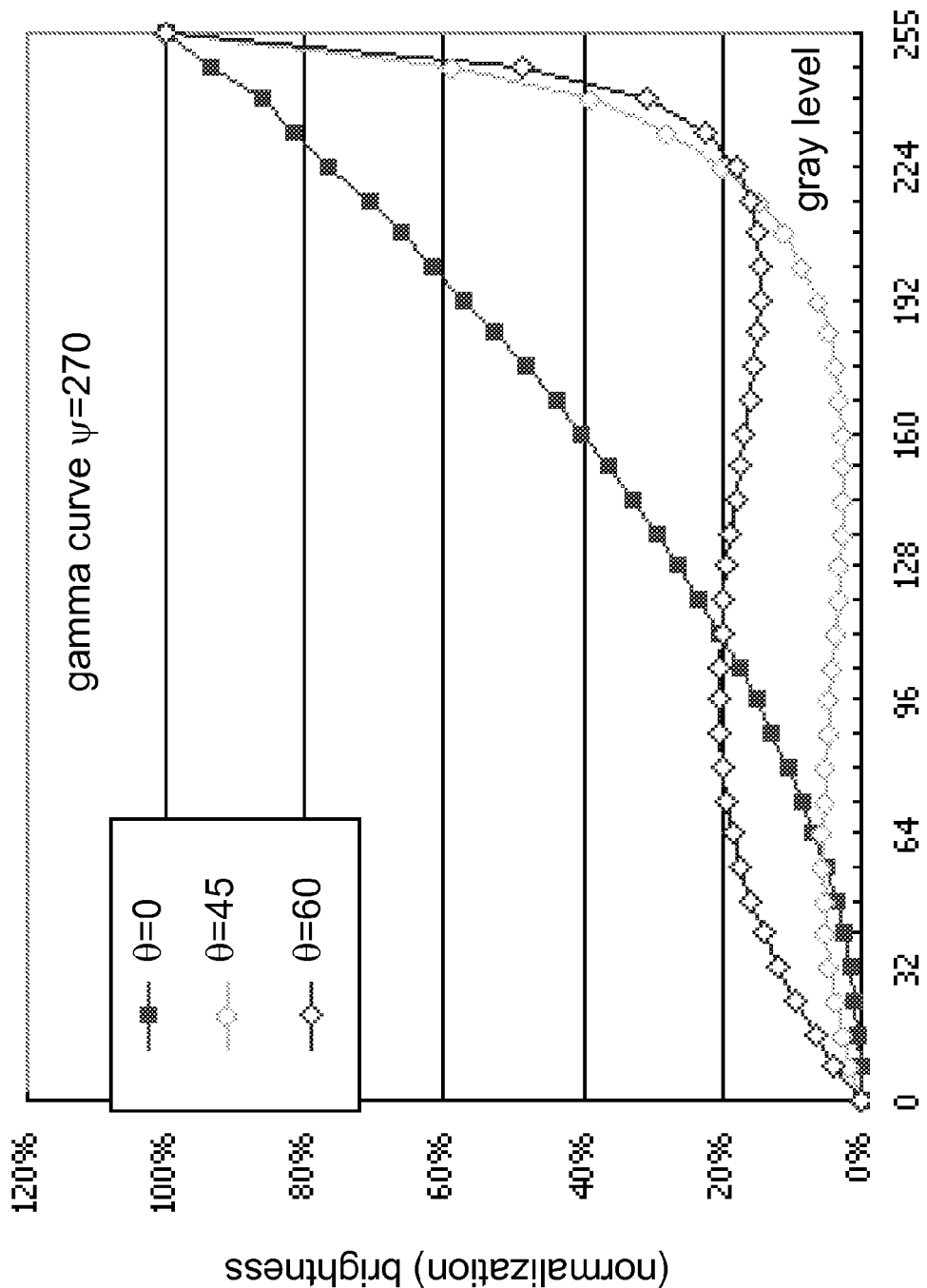
FIG. 47 illustrates gamma curves of the display apparatus without using the diffractive optical element (comparative example) from the front view (zenith angle of 0 degree) and the side viewing angles (zenith angles of 45 degrees and 60 degrees).
Figure 48:
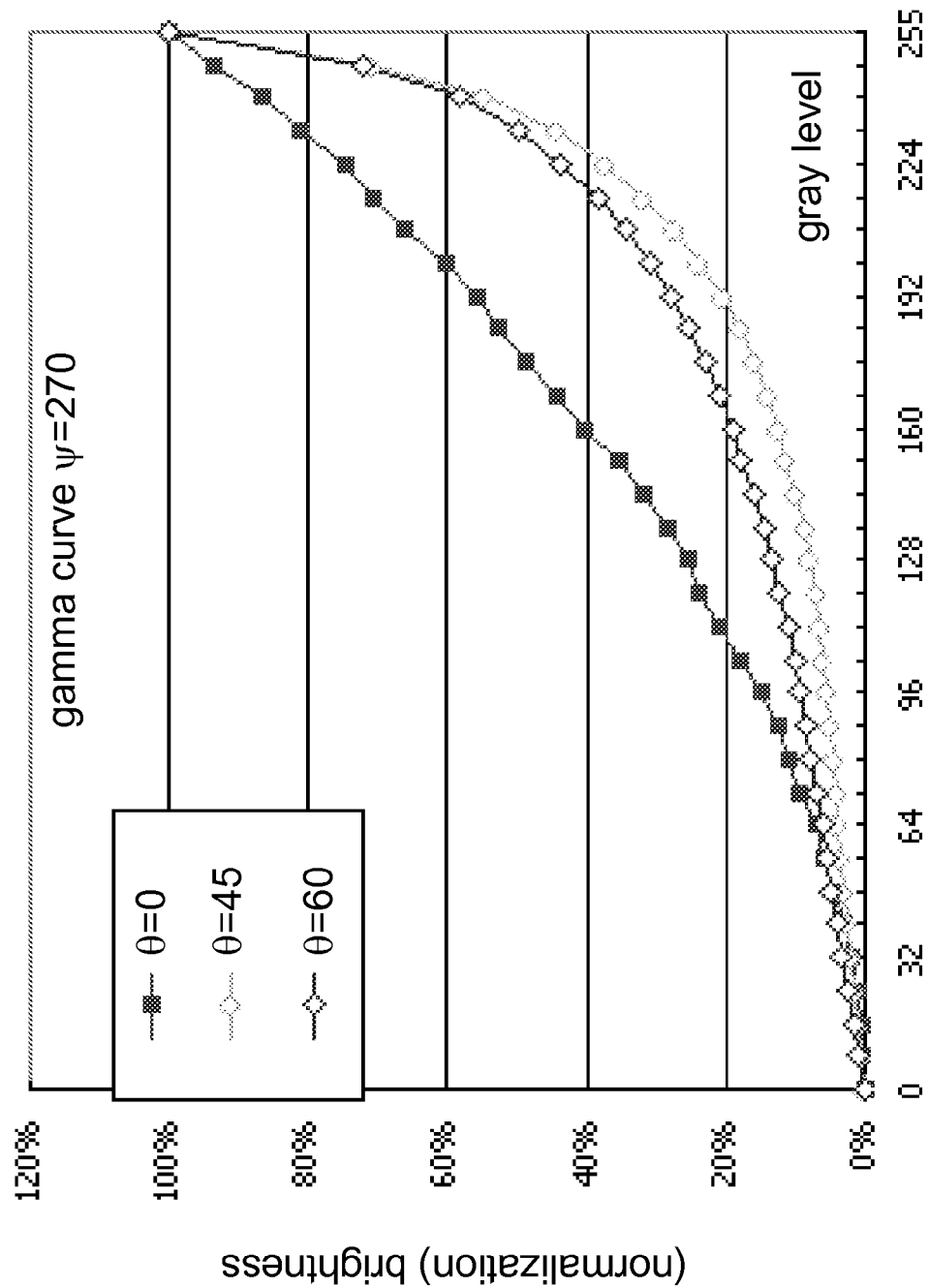
FIG. 48 illustrates gamma curves of the display apparatus with using the diffractive optical element from the front view (zenith angle of 0 degree) and the side viewing angles (zenith angles of 45 degrees and 60 degrees).
Figure 49:
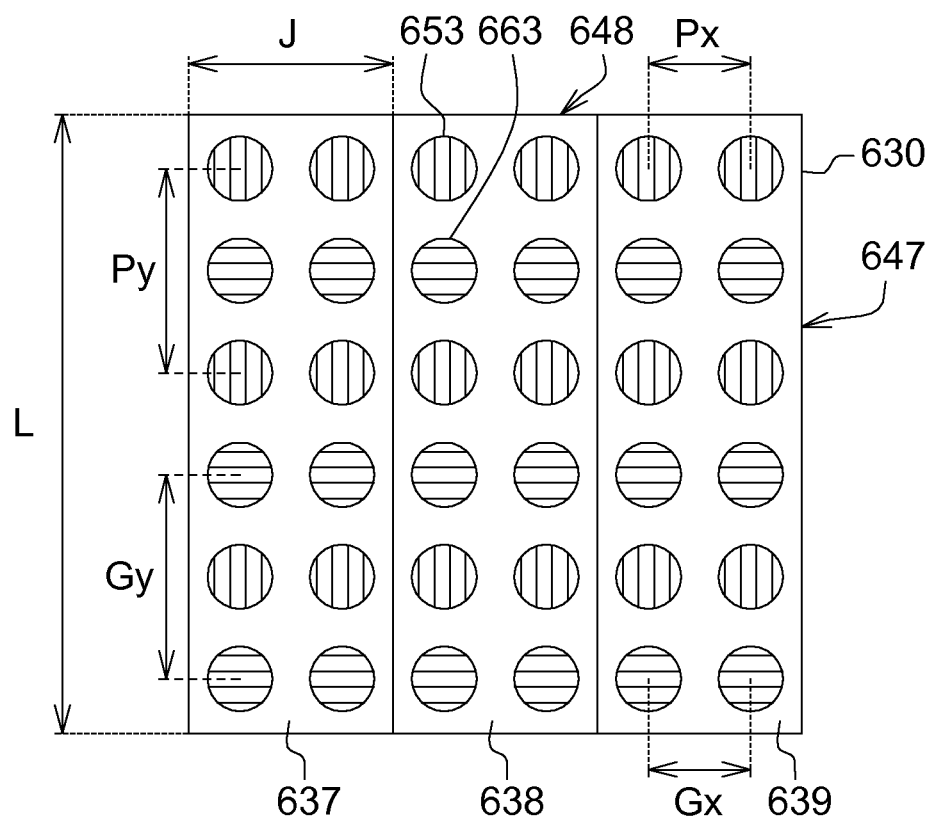
FIGS. 49-51 illustrate the relations between the diffractive optical element and the pixel of the display device.
Figure 50:
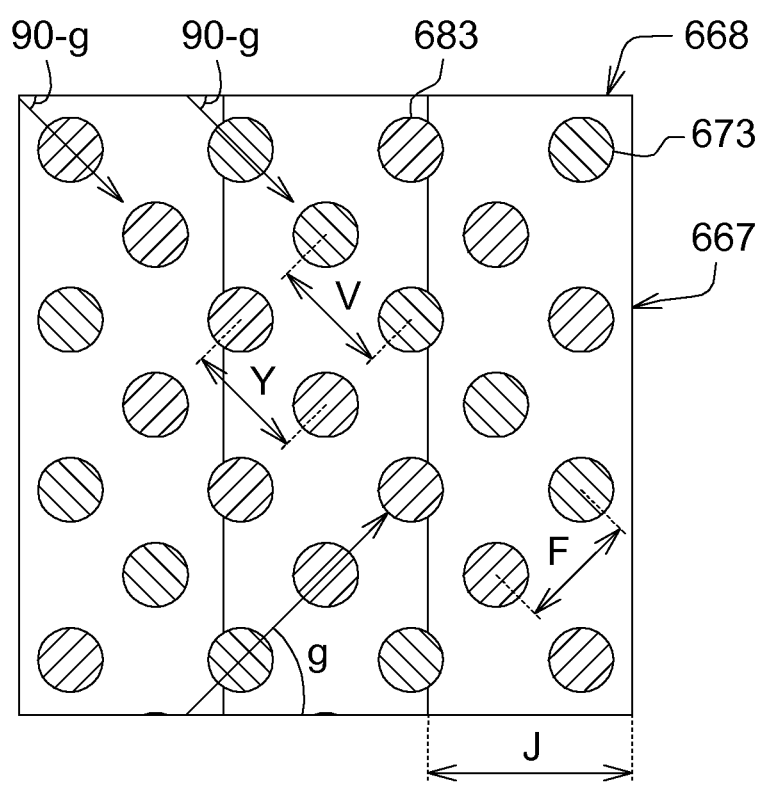
Figure 51:
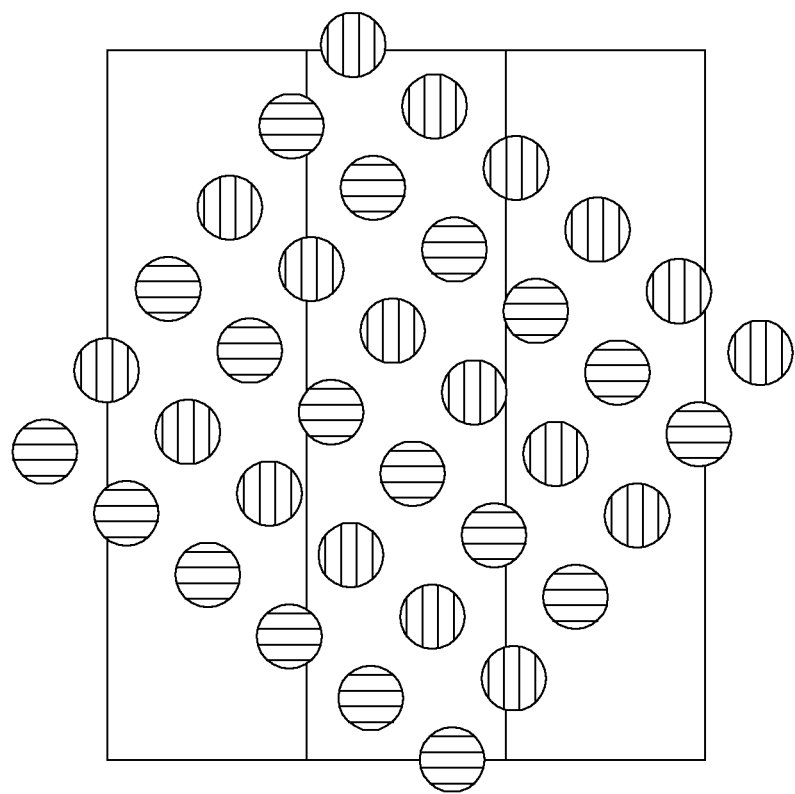
Figure 59:
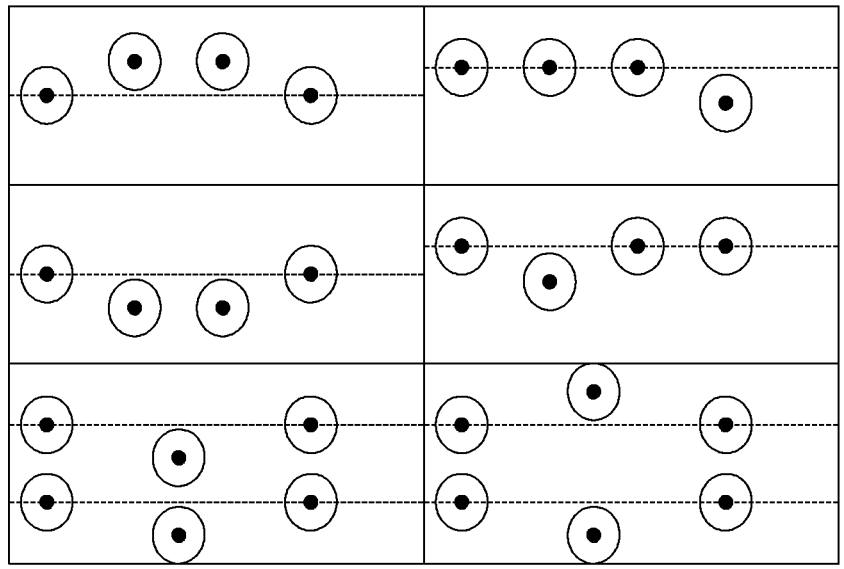
Figure 60:
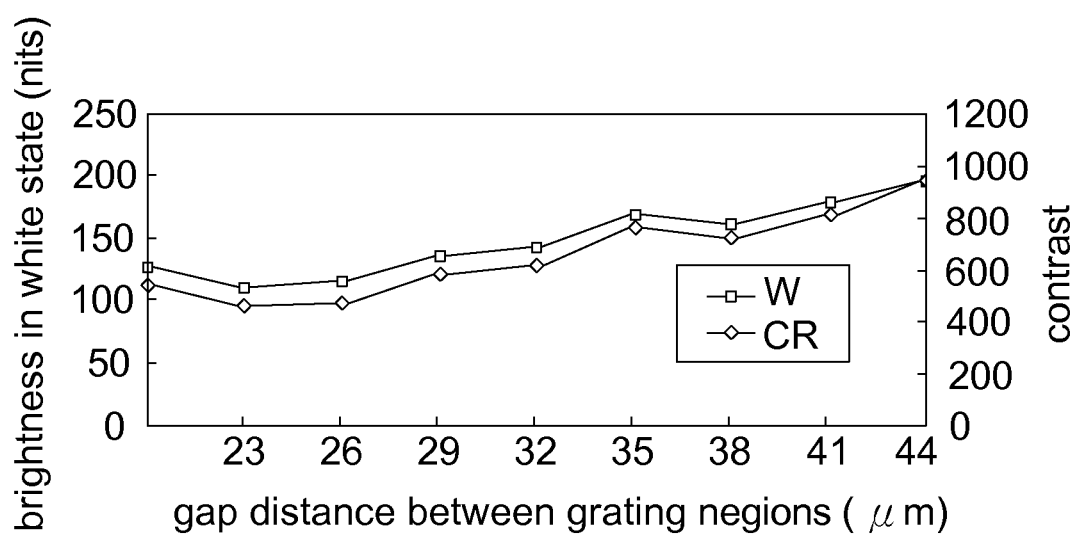
FIG. 60 illustrates the relation curves between the contrast and the brightness in the white state of the display apparatus and the gap distance between the grating regions of the diffractive optical element.

FIG. 1 illustrates a three dimensional diagram of a display apparatus according to one embodiment of the present invention. FIGS. 2-11 and 20-32 illustrate diffractive optical elements in embodiments. FIGS. 12-19 illustrate grating regions of the diffractive optical elements in embodiments. FIG. 33 illustrates a cross-section view of the display apparatus in one embodiment. FIG. 34 illustrates a three dimensional diagram of an alignment film and a liquid crystal layer in the display device. FIG. 35 illustrates a liquid crystal tilt azimuth angle of a liquid crystal molecule of the liquid crystal layer. FIGS. 36-41 illustrate relations between the diffractive optical element and the polarizing direction of the polarizer. FIG. 42 shows a relation between a contrast of the display device and the diffractive optical element having the diffraction grating having two kinds of azimuth angles. FIG. 43 illustrates gamma curves of the display apparatus without using the diffractive optical element (comparative examples) from the front view (zenith angle: 0 degree) and the side viewing angle (zenith angle: 45 degrees and 60 degrees). FIG. 44 illustrates gamma curves of the display apparatus with using the diffractive optical element from the front view (zenith angle: 0 degree) and from the side viewing angle (zenith angle: 45 degrees and 60 degrees). FIG. 45 shows a relation among the diffractive optical element having diffraction gratings of three kinds of azimuth angles, the contrast and the brightness in the white state of the display device. FIG. 46 shows a relation among the diffractive optical element having the diffraction gratings of three kinds of the azimuth angles, the contrast and the brightness in the black state of the display device. FIG. 47 illustrates gamma curves of the display apparatus without using the diffractive optical element (comparative example) from the front view (zenith angle: 0 degree) and from the side viewing angle (zenith angle: 45 degrees and 60 degrees). FIG. 48 illustrates gamma curves of the display apparatus with using the diffractive optical element from the front view (zenith angle: 0 degree) and from the side viewing angle (zenith angle: 45 degrees and 60 degrees). FIGS. 49-51 illustrate relations between the diffractive optical element and the pixel of the display device. FIGS. 52-59 illustrate arrangements of the grating region and a pixel unit region. FIG. 60 illustrates a relation among the contrast, the brightness in the white state, and the gap distance between the grating regions of the diffractive optical element of the display apparatus.

Referring to FIG. 1, the diffractive optical element 2 is disposed on a light emitting side of the display device 10 for displaying an image. The display device 10 may be a liquid crystal display device, a plasma display device, an OLED display device and an electronic paper display device, or other kinds of the display device for displaying an image. The display device 10 may be incorporated with other elements, such as a touch element for forming a touch panel. The diffractive optical element 2 may be used with other elements, such as an anti-reflection film or a touch panel, and disposed on a light emitting side of the display device 10 for displaying an image. The liquid crystal display device may be a vertical aligned/multi-domain vertical aligned liquid crystal display device, a twisted nematic (TN) liquid crystal display device, a super twisted nematic (STN) liquid crystal display device, or an optically compensated bend (OCB) liquid crystal display device or color sequential liquid crystal display (i.e. a liquid crystal display without color filter). The diffractive optical element 2 may be a film having a grating, such as a phase grating, for diffracting a light emitted from the display device 10. An observation angle to the liquid crystal display device is presented by a zenith angle θ and an azimuth angle ψ in spherical coordinate. The azimuth angle ψ indicates an included angle on the X-Y plane from the X-axis. The zenith angle θ indicates an included angle from the Z-axis perpendicular to the X-Y plane. The positive included angle represents a counter-clockwise-direction included angle, and the negative included angle represents a clock-wise-direction included angle.

Figure 2:
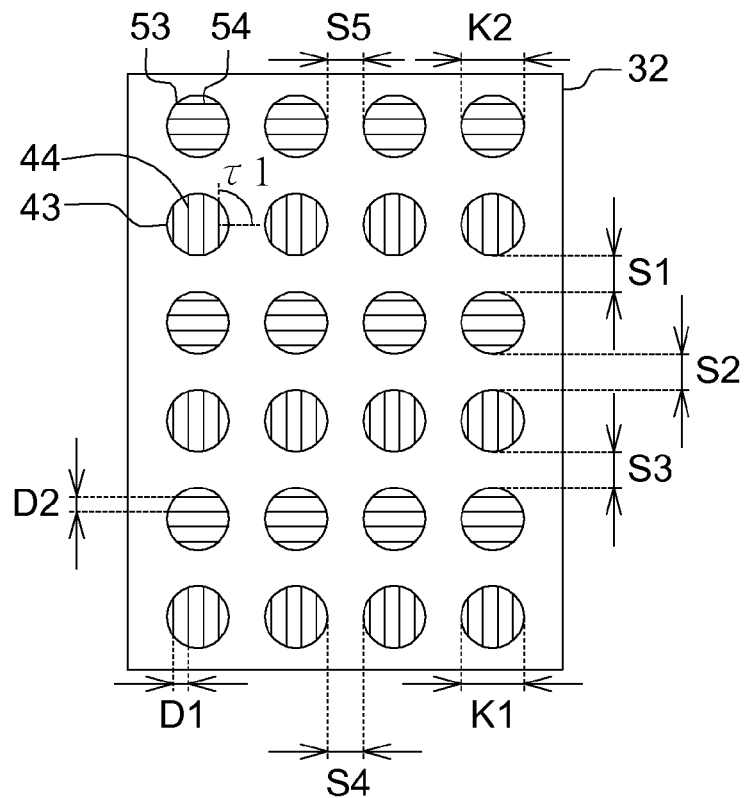

Referring to FIG. 2, in embodiments, the diffractive optical element 32 comprises the grating region 43 and the grating region 53 separated from each other. An "ordinary region (or non-grating region)" besides the grating region 43 and the grating region 53 of the diffractive optical element 32 is a region that generates a low-degree diffraction effect. In particular, the grating region 43 and the grating region 53 can generate a high-degree effect diffraction effect of a intensity ratio of the total zero order diffraction light (the light having an emitting direction same with an incident direction) to the total non-zero order diffraction light (the light having an emitting direction different from an incident direction) lower than 100:1 to a light passing through the grating region 43 and the grating region 53 with a specific direction. The "ordinary region (or non-grating region)" generates the low-degree effect diffraction effect of a intensity ratio of the total zero order diffraction light (the light having an emitting direction same with an incident direction) to the total non-zero order diffraction light (the light having an emitting direction different from an incident direction) higher than 100:1 to a light passing through the "ordinary region (or non-grating region) ", so as to increase penetration quantity of the light. Alternatively, the "ordinary region (or non-grating region) passes through no light almost. That is, a light-opaque region can have the similar effect with the "ordinary region (or non-grating region). The grating regions 43 and the grating regions 53 are arranged in rows. The grating regions 43 and the grating regions 53 arranged in alternation constitute columns. The grating region 43 and the grating region 53 respectively have the diffraction grating 44 and the diffraction grating 54. The diffraction grating 44 and the diffraction grating 54 respectively have constant period and uniform directions (azimuth angles). The connecting lines of the wave crests (or wave troughs) of the diffraction grating 44 having a substantially constant gap distance between the connecting lines. The connecting lines of the wave crests (or wave troughs) of the diffraction grating 54 having a substantially constant gap distance between the connecting lines.

In embodiments, the direction of the diffraction grating is the direction of the connecting line of the wave crests (or the wave troughs) of the diffraction grating structure. In embodiments, the direction of the diffraction grating of the grating region is indicated by a solid line. An included angle between the direction of the diffraction grating and the X-axis is the azimuth angle τ of the diffraction grating. In one embodiment, the period of the diffraction grating represents a gap distance between the wave crests (or a gap distance between the wave troughs. For example, the period D1 of the diffraction grating 44 is 1 µm, indicating that the gap distance between the wave crests of the diffraction grating structure of the grating region 43 is 1 µm. The period D2 of the diffraction grating 54 may be 1 µm. The direction of the diffraction grating 44 is different from the direction of the diffraction grating 54. The direction of the diffraction grating 44 may be perpendicular to the direction of the diffraction grating 54. In this case, for example, the azimuth angle τ1 of the diffraction grating 44 is 90 degrees. The azimuth angle of the diffraction grating 54 is 0 degree. The grating region 43 and the grating region 53 may have spherical shapes respectively having a diameter K1 and a diameter K2, such as 28 µm-29 µm. A refractive index of a material of the diffraction grating may be about 1.49. A height between the wave crest and the wave trough of the diffraction grating structure is about 0.4 µm. For example, the refractive index of the material, the gap distance between the wave crests, or the height between the wave crest and the wave trough of the diffraction grating structure are designed properly, for generating a high-degree effect diffraction effect of a intensity ratio of the total zero order diffraction light (the light having an emitting direction same with an incident direction) to the total non-zero order diffraction light (the light having an emitting direction different from an incident direction by a deflection angle bigger than 15 degrees) lower than 100:1 to a light passing through the diffraction grating structure with a specific direction. The non-grating region is designed properly for generating the low-degree effect diffraction effect of an intensity ratio of the total zero order diffraction light (the light having an emitting direction same with an incident direction) to the total non-zero order diffraction light (the light having an emitting direction different from an incident direction by a deflection angle bigger than 15 degrees) higher than 100:1 to a light passing through the non-grating region. The design method for the non-grating region is not described in detail herein.

In other embodiments, the single grating region may have diffraction gratings having the same azimuth angle and various periods. For example, the single grating region has diffraction gratings having two kinds of the gap distances between connecting lines of wave crests (or wave troughs), substantially 1 µm and 0.5 µm. An area of the grating region may occupy 17.5%~94% of an area of the diffractive optical element.

Referring to FIG. 2, in a line constituted by the grating region 43 and the grating region 53 arranged in alternation, the closest gap distance between the grating region 43 and the grating region 53 may be constant or varied according to actual demands. For example, the closest gap distances S1, S2 of the grating regions 43 and the grating regions 53 may be 1 µm-15 µm, such as 1 µm, 9 µm, or 15 µm both. In other embodiments, the gap distance S1 is 9 µm, and the gap distance S2 is 15 µm. In another embodiment, the closest gap distance between the grating region 43 and the grating region 53 may be 0 or negative that is the grating region 43 and the grating region 53 have an overlapping area therebetween.

Referring to FIG. 2, for example, in a line constituted by the grating regions 43 or in a line constituted by the grating regions 53, the closest gap distance between the grating regions 43 or the closest gap distance between the grating regions 53 may be adjusted to be constant or varied according to actual demands. In one embodiment, the closest gap distance S4 between the grating regions 43 and the closest gap distance S5 between the grating regions 53 are respectively 1 µm-15 µm, such as 1 µm and 13 µm. In another embodiment, the closest gap distance S4 between the grating regions 43 and the closest gap distance S5 between the grating regions 53 may be 0 or negative that is the grating region 43 and the grating region 53 have an overlapping area therebetween.

Figure 3:
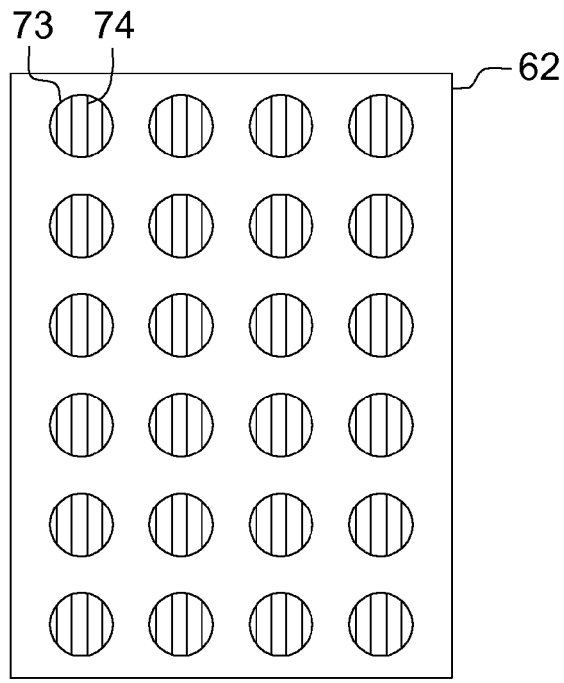

In one embodiment, the azimuth angle the first kind of the diffraction grating of the diffractive optical element is 0±60 degrees, that is the angle is in a range of bigger than and equal to −60 degrees, smaller than and equal to +60 degrees, and equal to 0 degree, and the similar concept is not described repeatedly hereafter. The azimuth angle the first kind of the diffraction grating of the diffractive optical element is 0±20 degrees preferably. In addition, the azimuth angle the second kind of the diffraction grating of the diffractive optical element is 90±60 degrees, preferably 90±20 degrees. In another embodiment, the azimuth angle of the diffraction grating of the first kind is +45 degrees, ±20 degrees, preferably ±45±10 degrees, and the azimuth angle of the diffraction grating of the second kind is 135±20 degrees, preferably 135±10 degrees. In yet another embodiment, the azimuth angle of the diffraction grating of the first kind is −45±20 degrees, preferably −45±10 degrees, and the azimuth angle of the diffraction grating of the second kind is 45±20 degrees, preferably 45±10 degrees. An area of the grating region of the first kind may occupy 17.5%~38.5% of an area of the diffractive optical element, and an area of the grating region of the second kind may occupy 17.5%~38.5% of the area of the diffractive optical element. The diffractive optical element 62 in FIG. 3 is different from the diffractive optical element 32 in FIG. 2 in that the diffractive optical element 62 has a grating region 73 having a diffraction grating 74 of a constant azimuth angle.

Figure 4:
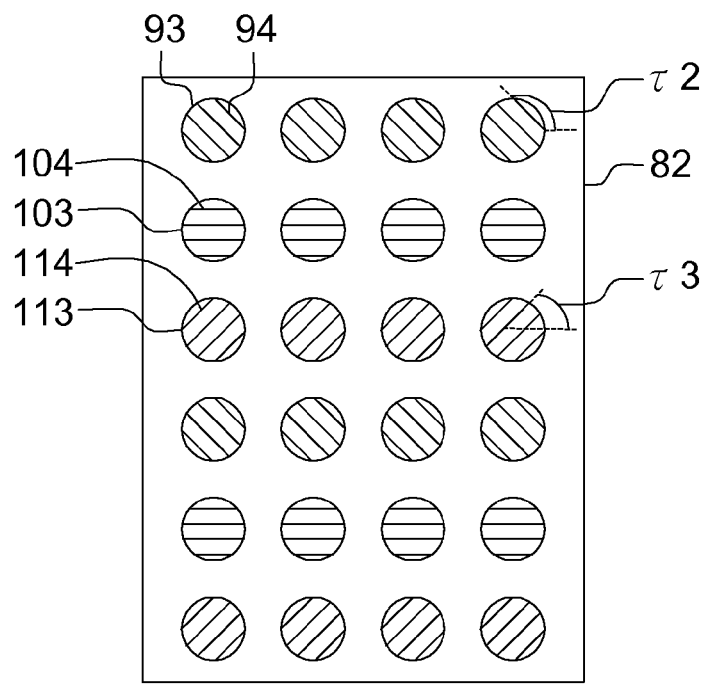

The diffractive optical element 82 in FIG. 4 is different from the diffractive optical element 32 in FIG. 2 in that the diffractive optical element 82 comprises grating regions 93, 103 and 113 respectively having diffraction gratings 94, 104 and 114 of different azimuth angles. For example, the azimuth angle τ2 of the diffraction grating 94 is 135 degrees, the azimuth angle of the diffraction grating 104 is 0 degree, and the azimuth angle τ3 of the diffraction grating 114 is 45 degrees.

In one embodiment, the azimuth angles of the diffraction gratings of the first kind, the second kind and the third kind of the diffractive optical element are respectively 90±15 degrees, 135±15 degrees and 45±15 degrees. In another embodiment, the azimuth angles of the diffraction gratings of the first kind, the second kind and the third kind are respectively 15±10 degrees, 60±10 degrees and −30±10 degrees. In yet another embodiment, the azimuth angle of the diffraction grating of the first kind is 0±40 degrees, preferably 0±20 degrees, the azimuth angle of the diffraction grating of the second kind is 45±40 degrees, preferably 45±20 degrees, and the azimuth angle of the diffraction grating of the third kind is 135±40 degrees, preferably 135±20 degrees. An area of the grating region of the first kind may occupy 17.5%~38.5% of an area of the diffractive optical element. An area of the grating region of the second kind may occupy 17.5%~38.5% of an area of the diffractive optical element. In addition, an area of the grating region of the third kind may occupy 17.5%~38.5% of an area of the diffractive optical element.

Figure 5:
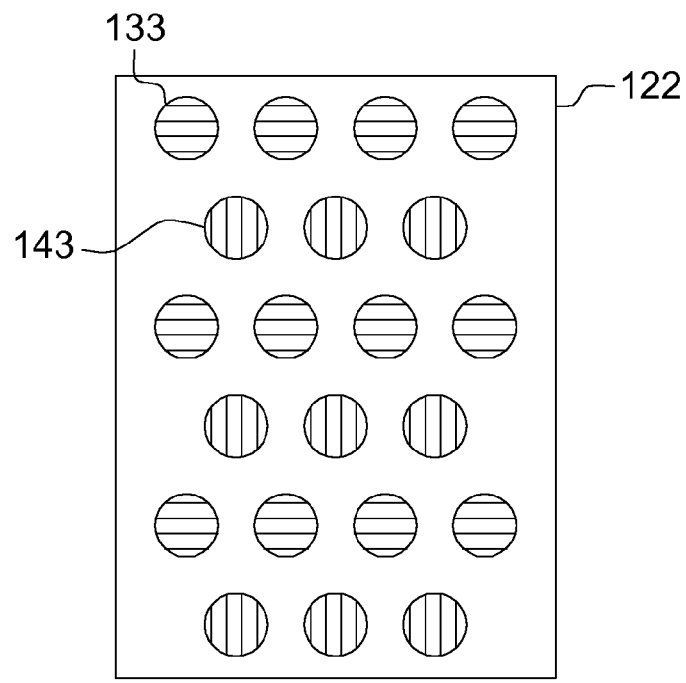

The diffractive optical element 122 in FIG. 5 is different from the diffractive optical element 32 in FIG. 2 in that the grating regions 133 and the grating regions 143 are respectively arranged in rows, and the grating regions 133 and the grating regions 143 are arranged in alternation in rows vertically.

Figure 6:
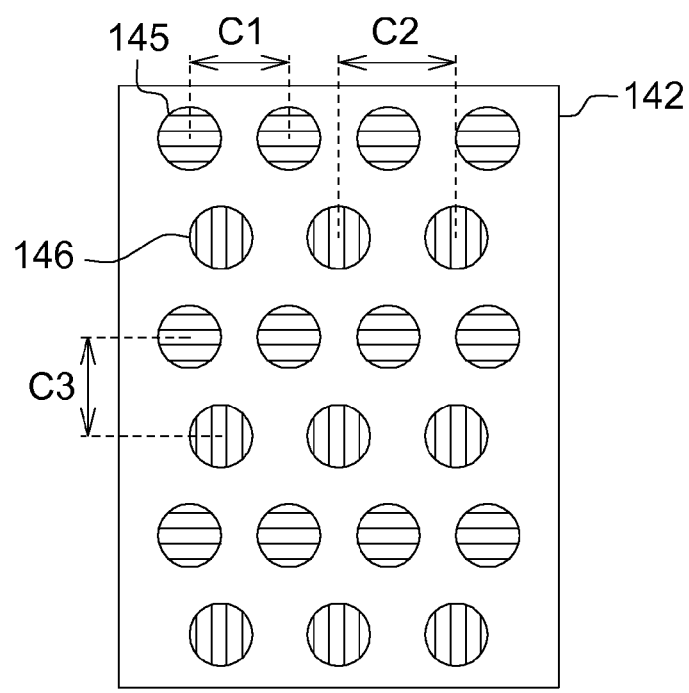

The diffractive optical element 142 in FIG. 6 is different from the diffractive optical element 132 in FIG. 5 in that a horizontal (X direction) period C1 between the grating regions 145 is different from the horizontal period C2 between the grating regions 146. In one embodiment, the period C1 is 30 μm, and the period C2 is 48 μm. In addition, the vertical (Y direction) cycle space C3 between the grating region 145 and the grating region 146 is 41 μm. The cycle space also means an appearing cycle between the grating regions respectively having different grating directions.

Figure 7:
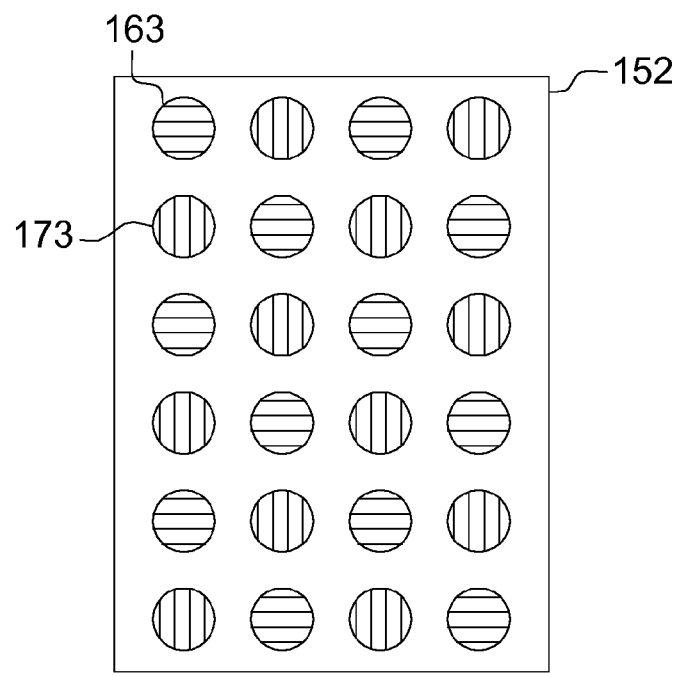

The diffractive optical element 152 in FIG. 7 is different from the diffractive optical element 32 in FIG. 2 in that all the grating regions 163 and the grating regions 173 are arranged in alternation.

Figure 8:
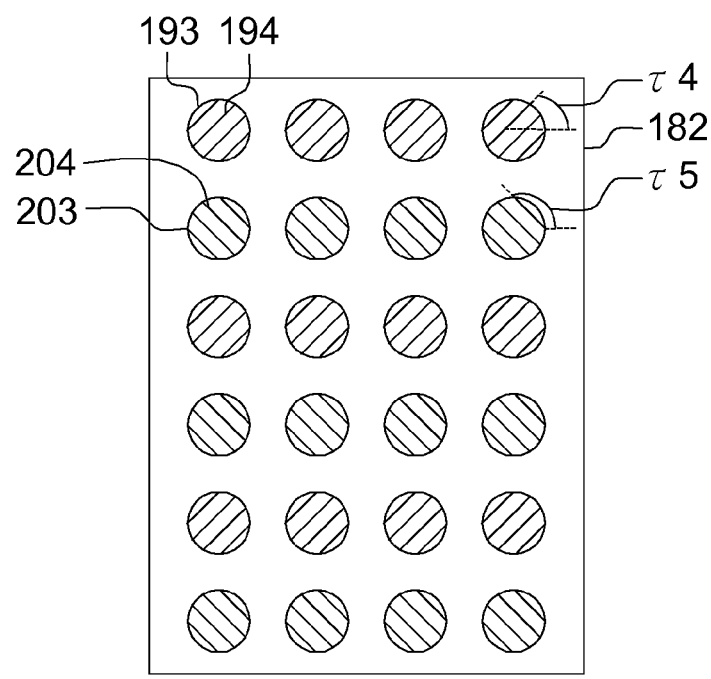

The diffractive optical element 182 in FIG. 8 is different from the diffractive optical element 32 in FIG. 2 in that the diffraction grating 194 of the grating region 193 and the diffraction grating 204 of the grating region 203 have azimuth angles other than 0 degree and 90 degrees. For example, the azimuth angle τ4 of the diffraction grating 194 is 45 degrees. The azimuth angle τ5 of the diffraction grating 204 is 135 degrees.

Figure 9:
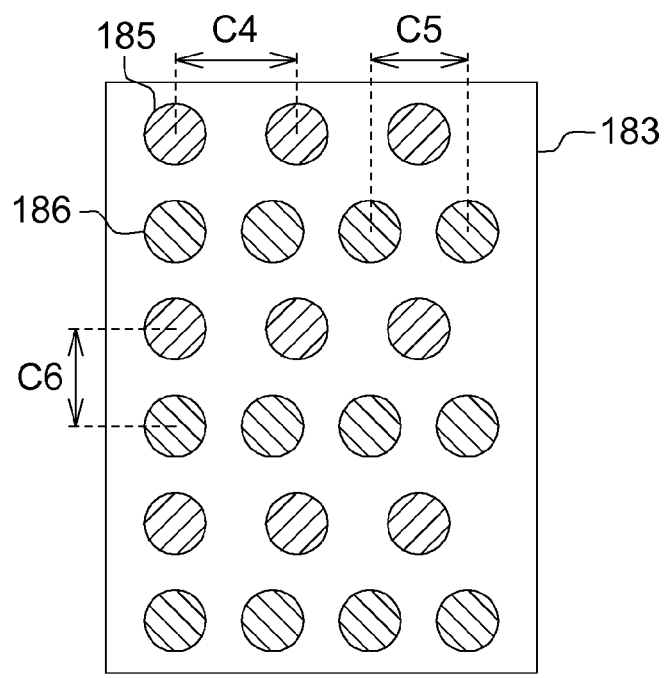

The diffractive optical element 183 in FIG. 9 is different form the diffractive optical element 182 in FIG. 8 in that the horizontal (X direction) period C4 between the grating regions 185 is different from the horizontal period C5 between the grating regions 186. In one embodiment, the period C4 is 30 μm, and the period C5 is 48 μm. In addition, the vertical (Y direction) cycle space C6 between the grating region 185 and the grating region 186 is 41 μm.

In one embodiment, the diffractive optical element may have grating regions of more than three kinds of diffraction grating directions.

Figure 10:
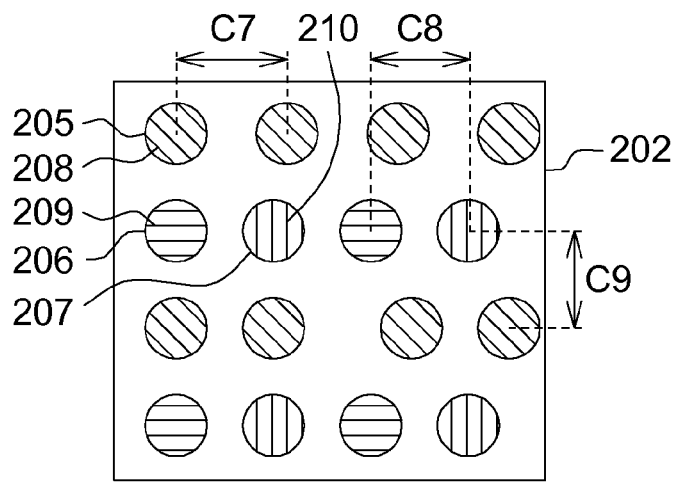
Figure 14:
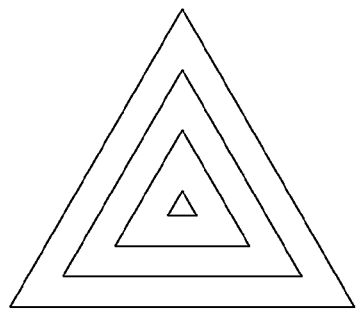
Figure 15:
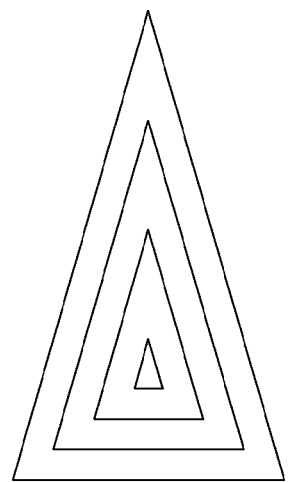

Referring to FIG. 10, for example, the diffractive optical element 202 has the grating region 205, the grating region 206 and the grating region 207. The azimuth angle of the diffraction grating 208 of the grating region 205 is 135 degrees. The azimuth angle of the diffraction grating 209 of the grating region 206 is 0 degree. The azimuth angle of the diffraction grating 210 of the grating region 207 is 90 degrees. In embodiments, the grating regions 205 having a higher amount (or density) are arranged into one row, and the grating regions 206 and the grating regions 207 having a lower amount (or density) are arranged in alternation into another raw, so as to utilizing arrangement space of the diffractive optical element 202 properly. In a case of the TN panel using the diffractive optical element 202, the grating region 205 is mainly used for compensating up and down gray level reversion direction, and the grating region 206 and the grating region 207 are mainly used for compensating 45 degrees and −45 degrees direction. That is, the diffractive optical element 202 is used by rotating 45 degrees (+45 degrees) counter-clockwise. In one embodiment, the horizontal (X direction) period C7 between the grating regions 205 is different from the horizontal (X direction) period C8 between the grating region 206 and the grating region 207. For example, the period C7 is 36 μm, and the period C8 is 32 μm. In another embodiment, the vertical (Y) cycle space C9 between the grating region 205 and the grating region 207 (or the grating region 206) is 36 μm.

Referring to FIG. 11, for example, the azimuth angle of the diffraction grating 174 of the diffractive optical element 192 is 0 degree. The azimuth angle τ6 of the diffraction grating 184 is 45 degrees. The azimuth angle τ7 of the diffraction grating 214 is 90 degrees. In addition, the azimuth angle τ8 of the diffraction grating 234 is 135 degrees. In another embodiment, in the diffractive optical element having the diffraction gratings of more than three kinds of the azimuth angles, the grating regions having different azimuth angles may be arranged in alternation.

Figure 16:
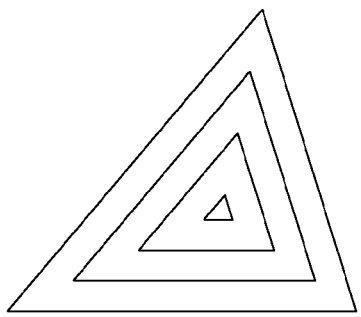
Figure 17:
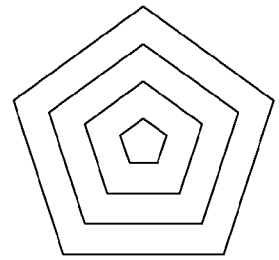
Figure 18:
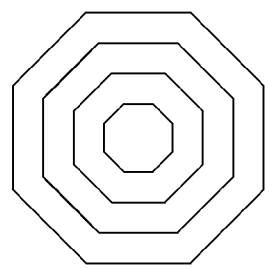
Figure 19:
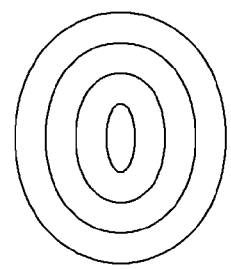

In one embodiment, the diffraction grating direction of the single grating region is not limited to only one direction. The single grating region may have the diffraction grating of various azimuth angles. In addition, the grating region is not limited to the spherical shape as shown in FIGS. 2-11. For example, in embodiments, the single grating region having four kinds of the diffraction grating directions may comprise square shapes (FIG. 12), rectangle shapes (FIG. 13) or other quadrilateral shapes. For example, the single grating region having three kinds of the diffraction grating directions may comprise regular triangle shapes (FIG. 14), isosceles triangle shapes (FIG. 15), non-isosceles triangle shapes (FIG. 16). For example, the single grating region having multiple kinds of the diffraction grating directions may comprise regular pentagon shapes (FIG. 17) or other regular pentagon shapes; or regular octagon shapes (FIG. 18) or other octagon shapes; or spherical shapes (FIG. 19) or other curved shapes; or other suitable shapes. In addition, the effect from the grating of polygon shape can also be obtained a combination of the gratings of different directions, and therefore the present disclosure is not limited to the grating of polygon shape.

Figure 20:
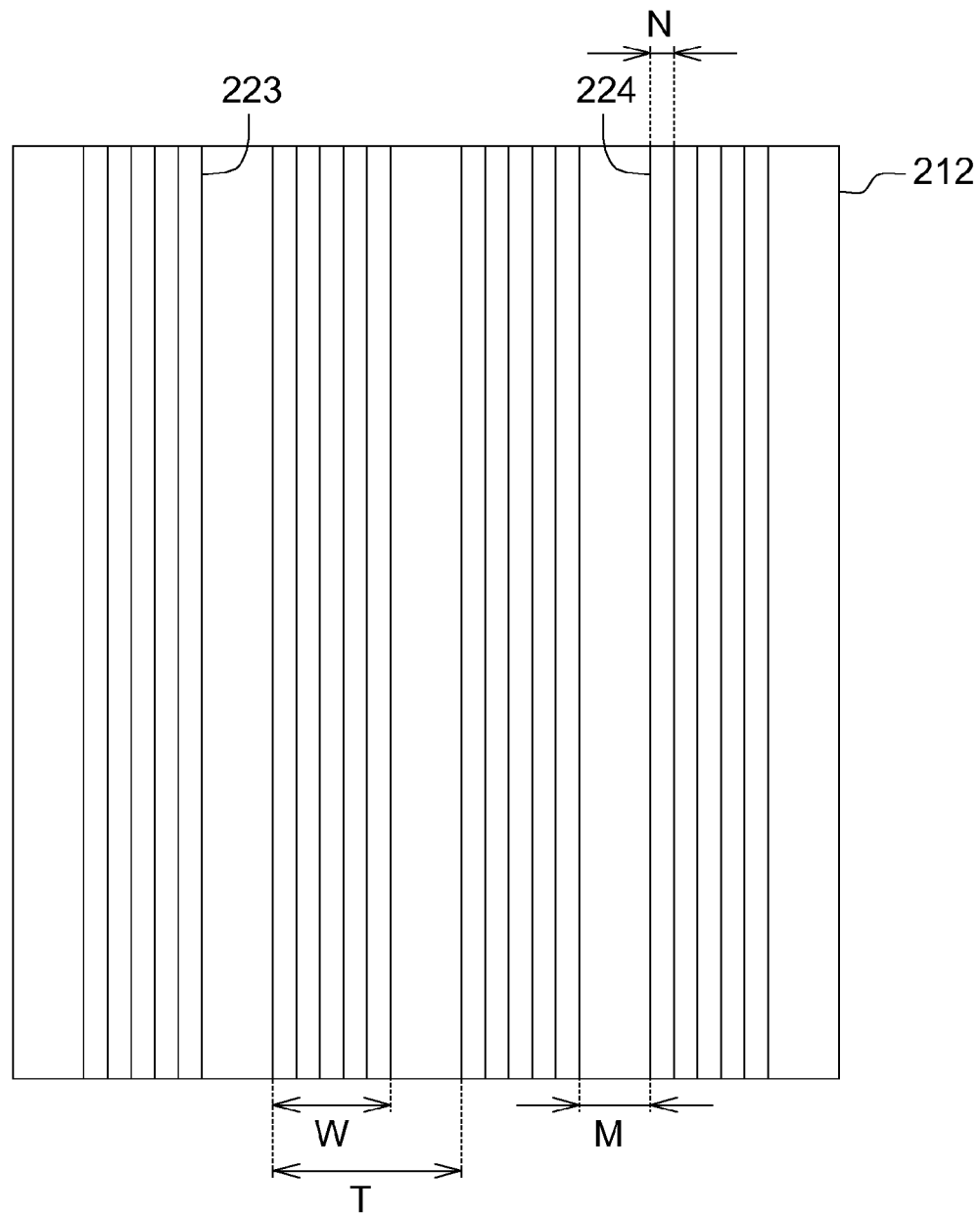

In some embodiments, the diffractive optical element 212 comprises the grating region 223 as shown in FIG. 20. Referring to FIG. 20, in one embodiment, the period T of the grating region 223 is 124 μm. A width W of the grating region 223 is 116 μm-118 μm. The period N of the diffraction gratings 224 is 1 μm. The gap distance M between the diffraction gratings 224 is 6 μm-8 μm. In another embodiment, the gap distance between the grating regions 223 may be 0 or negative. The negative gap distance means the adjacent grating regions 223 have an overlapping region therebetween.

Figure 21:
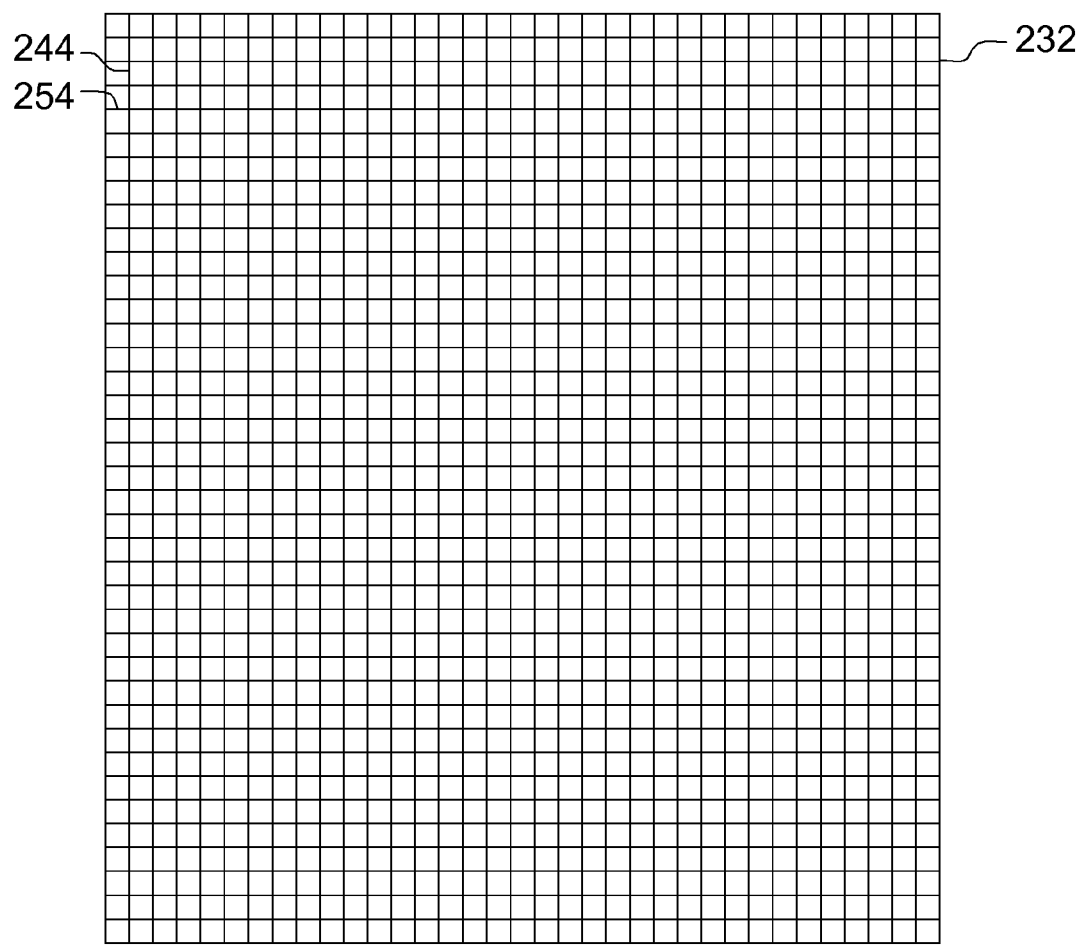
Figure 22:
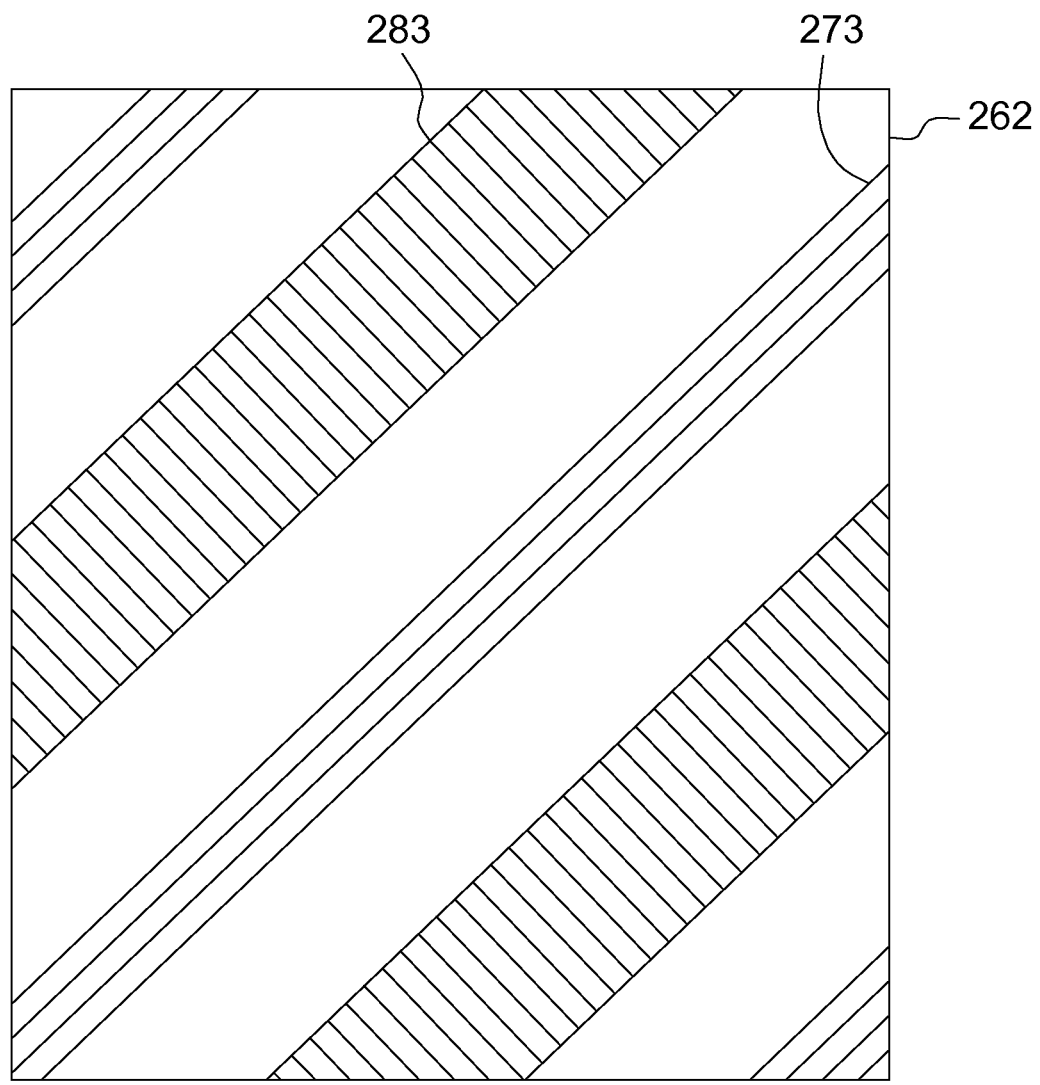

Referring to FIG. 21, the diffractive optical element 232 may also comprise the diffraction grating 244, the diffraction grating 254. The diffractive optical element 232 may also be regarded as a result of the grating region having the diffraction grating 244 and the grating region having the diffraction grating 254 overlapped with each other. In one embodiment, the diffractive optical element 262 comprises the grating region 273 and the grating region 283 as shown in FIG. 22.

Figure 23:
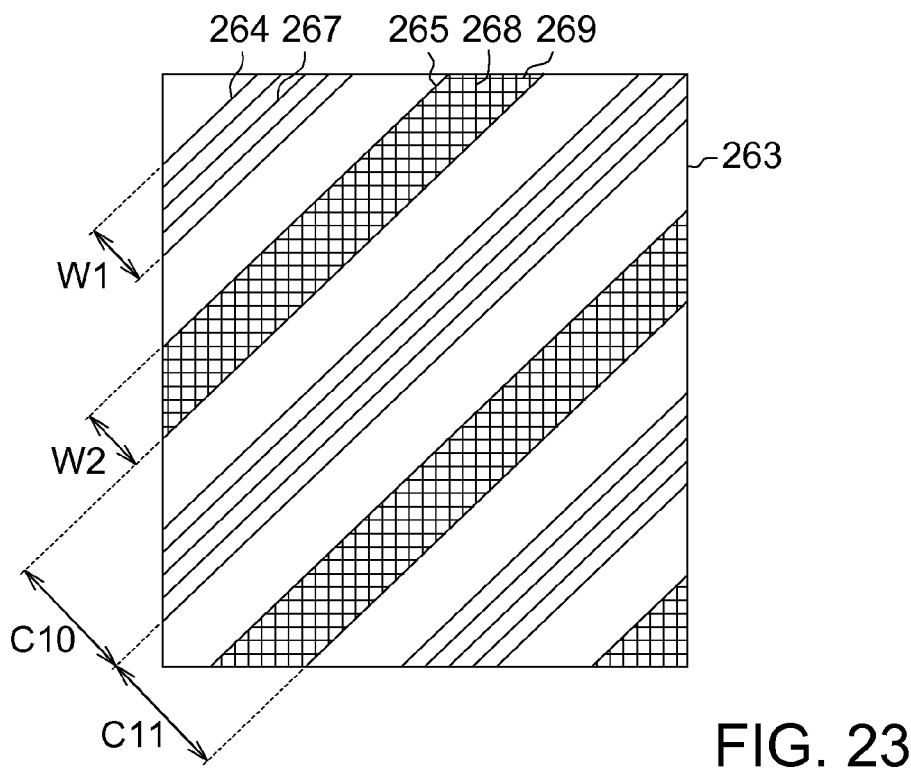

Referring to FIG. 23, the diffractive optical element 263 comprises the grating region 264 and the grating region 265. The azimuth angle of the diffraction grating 267 of the grating region 264 is 45 degrees. The azimuth angles of the diffraction grating 268 and the diffraction grating 269 of the grating region 265 are 90 degrees and 0 degree, respectively. In one embodiment, the width W1 of the grating region 264 measured along the azimuth angle of 135 degrees and the width W2 of the grating region 265 measured along the azimuth angle of 135 degrees are 20 μm, respectively. The gap distances C10 or C11 of the grating region 264 and the grating region 265 along the azimuth angle of 135 degrees are 60 μm.

Figure 24:
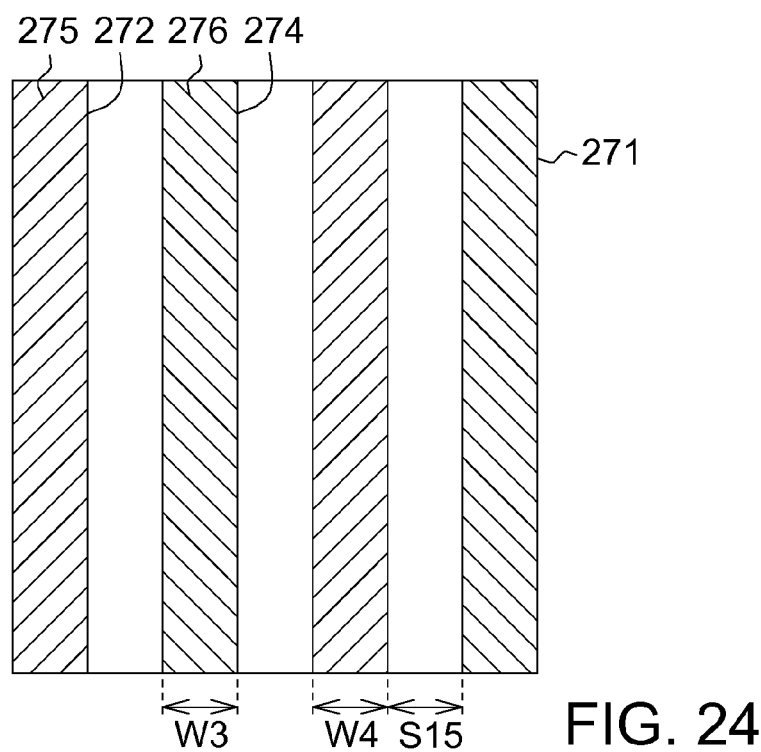

Referring to FIG. 24, the diffractive optical element 271 comprises the grating region 272 and the grating region 274. The azimuth angle of the diffraction grating 275 of the grating region 272 is 45 degrees. The azimuth angle of the diffraction grating 276 of the grating region 274 is 135 degrees. In one embodiment, the horizontal (X direction) width W3 of the grating region 272 and the horizontal (X direction) width W4 of the grating region 274 are 20 μm, respectively. The horizontal (X direction) gap distance between the grating region 272 and the grating region 274 is 36 μm.

Figure 25:
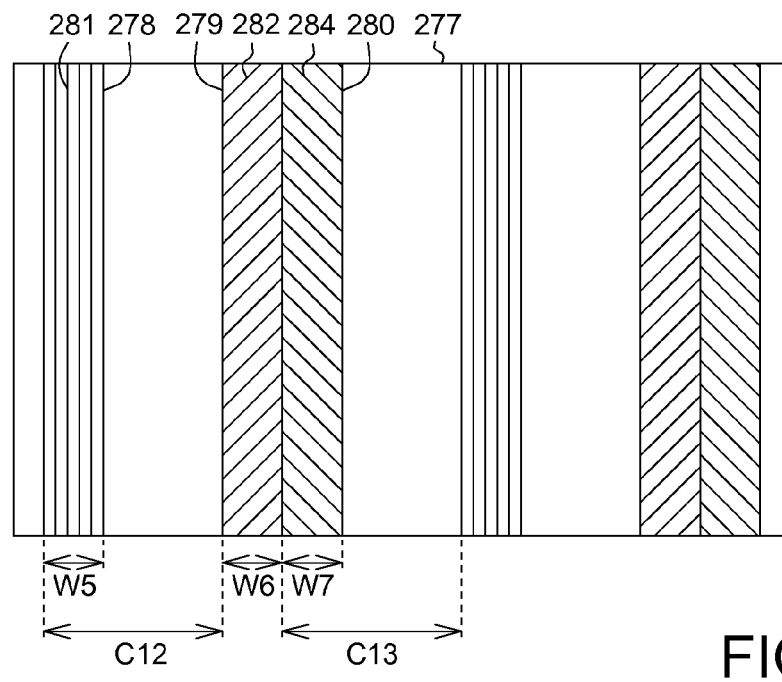

Referring to FIG. 25, the diffractive optical element 277 comprises the grating region 278, the grating region 279 and the grating region 280. The azimuth angle of the diffraction grating 281 of the grating region 278 is 90 degrees. The azimuth angle of the diffraction grating 282 of the grating region 279 is 45 degrees. The azimuth angle of the diffraction grating 284 of the grating region 280 is 135 degrees. In one embodiment, the horizontal (X direction) width W5 of the grating region 278, the horizontal (X direction) width W6 of the grating region 279 and the horizontal (X direction) width W7 of the grating region 280 are all 28 μm. The horizontal (X direction) cycle space C12 between the adjacent grating region 278 and grating region 279 is 60 μm. The horizontal (X direction) cycle space C13 between the adjacent grating region 278 and grating region 280 is 60 μm.

Figure 26:
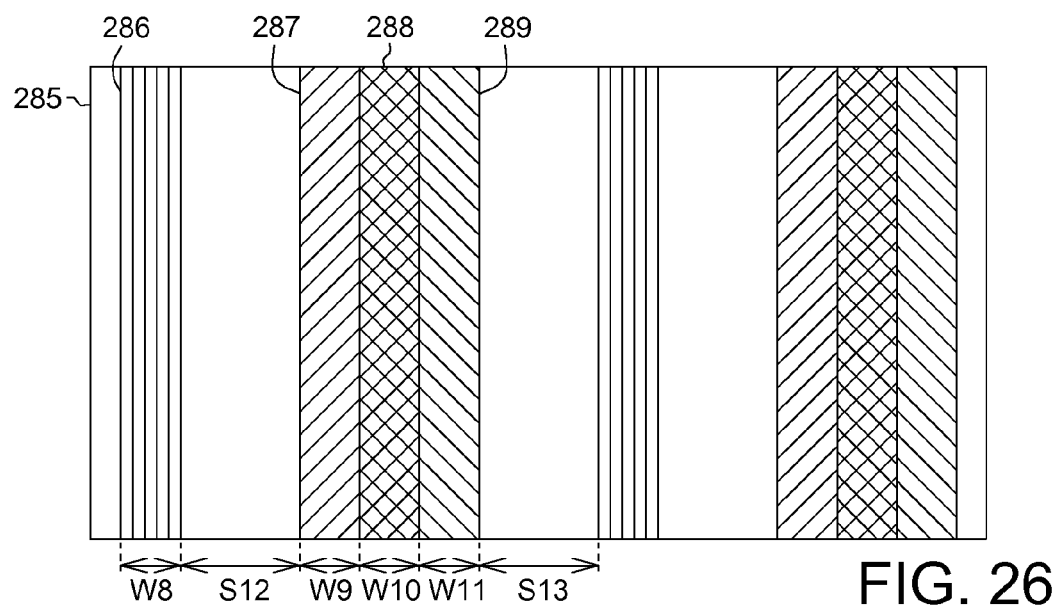

Referring to FIG. 26, in one embodiment, for example, the horizontal (X direction) width W8 of the grating region 286 is 22 μm. The horizontal (X direction) width W9 of the grating region 287 and the horizontal (X direction) width W11 of the grating region 289 are 18 μm, respectively. The horizontal (X direction) width W10 of the grating region 288 is 14 μm. The closest distance S12 between the grating region 286 and the grating region 287 is 25 μm. The closest distance S13 between the grating region 286 and the grating region 289 is 15 μm. In other embodiments, the element may be constituted by overlapping two diffractive optical elements 277 as shown in FIG. 25.

Figure 27:
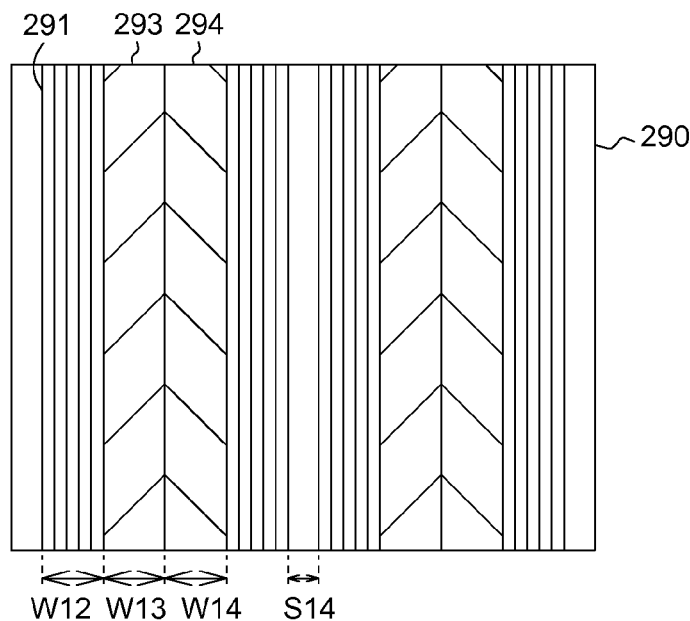

Referring to FIG. 27, the diffractive optical element 290 comprises the grating region 291, the grating region 293 and the grating region 294. In one embodiment, the horizontal (X direction) width W12 of the grating region 291, the horizontal (X direction) width W13 of the grating region 293, and the horizontal (X direction) width W14 of the grating region 294 are 28 μm, respectively. The closest distance S14 between the adjacent grating regions 291 is 5 μm.

Figure 28:
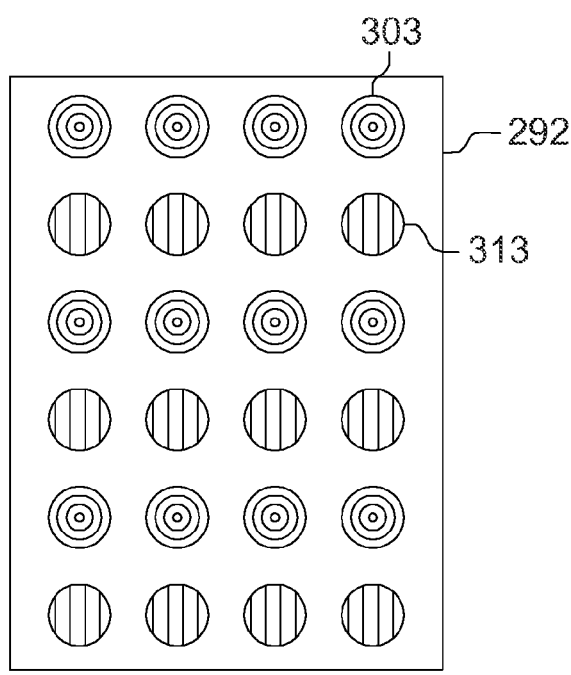

The diffractive optical element 292 may also comprise the grating region 303 and the grating region 313 as shown in FIG. 28.

Figure 29:
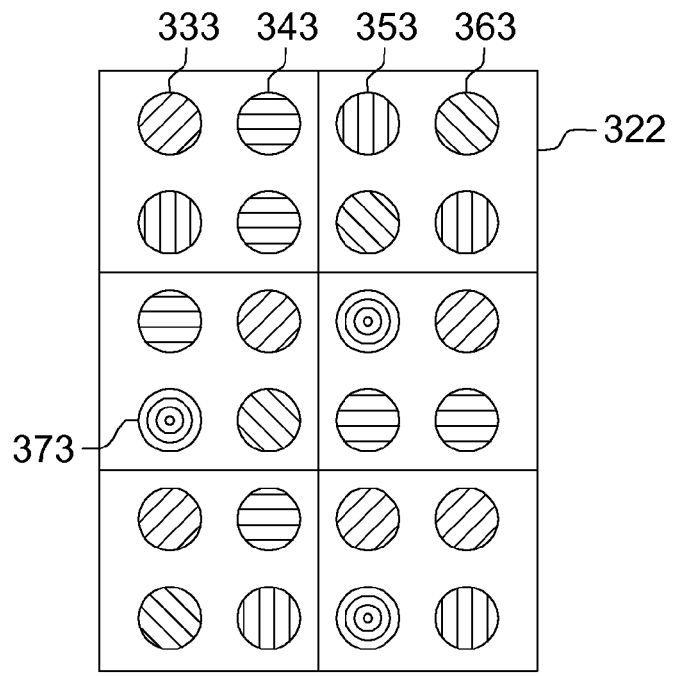

The grating regions of the diffractive optical element are not limited to order arrangement, and can be adjusted into disorder arrangement according to actual demands. Referring to FIG. 29, for example, the diffractive optical element 322 may also comprise the grating region 333, the grating region 343, the grating region 353, the grating region 363 and the grating region 373 disorderly.

In embodiments, the many diffractive optical elements can be overlapped for using according to actual demands. The diffractive optical elements of different levels may be arranged by overlapping the grating regions having the same pattern, i.e. the same shape or the same diffraction grating, of different levels with each other, or by overlapping the grating regions having different patterns, i.e. different shapes or diffraction gratings of different characteristics. Referring to FIG. 2, for example, in a case of overlapping one diffractive optical element 32 with another diffractive optical element 32, the grating region 53 of the one diffractive optical element 32 is overlapped with the grating region 43 of the another diffractive optical element 32, and the grating region 43 of the one diffractive optical element 32 is overlapped with the grating region 53 of the another diffractive optical element 32. For example, after a laser light source is emitted to a single-layer diffractive optical element 32 as shown in FIG. 2, diffraction lights of two directions such as 0/180 degrees or 90/270 degrees are formed. Conversely, after the laser light source is emitted to a stacked structure constituted by multi-layer diffractive optical elements, not only the transmission light having the diffraction directions as formed by the single-layer diffractive optical element, but also transmission lights having other diffraction directions such as oblique directions. Cause of this is from the additional the cycle structure for the oblique direction. In addition, it is presumed that diffraction light emitted from the grating region adjacent to a light source and generated from a light emitted into and the perpendicular to grating region adjacent to the light source is further diffracted by the grating region away from the light source. Therefore, besides the diffraction lights of two directions such as 0/180 degrees or 90/270 degrees are generated by the single-layer diffractive optical element, additional diffraction lights of other oblique directions such as 45 degrees, 135 degrees, 225 degrees, or 315 degrees or a bisector angle of the azimuth angles of two diffraction gratings are formed.

In embodiments, the stacked structure constituted by the diffractive optical elements of various layers may be constituted by overlapping the grating regions of the same pattern according to actual demands. Referring to FIG. 2, in one embodiment, for example, one diffractive optical element 32 is overlapped with another diffractive optical element 32. The grating region 43 of the one diffractive optical element 32 is overlapped with the grating region 43 of the another diffractive optical element 32. The grating region 53 of the one diffractive optical element 32 is overlapped with the grating region 53 of another diffractive optical element 32. It can increase diffraction effect.

Figure 30:
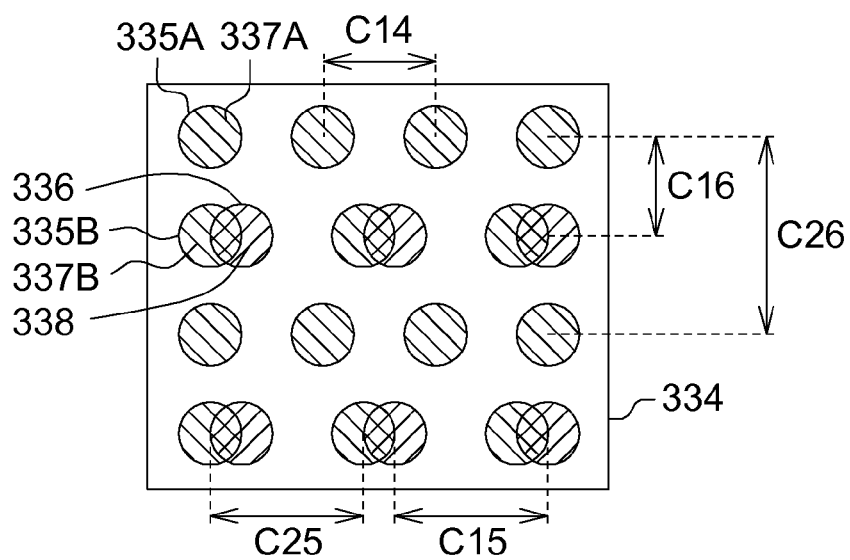

Referring to FIG. 30, the diffractive optical element 334 may be constituted by overlapping two diffractive optical elements. For example, one of the two diffractive optical elements has the grating region 335A and the grating region 335B, and the other of the two diffractive optical elements has the grating region 336. The azimuth angle of the diffraction grating 337A of the grating region 335A and the diffraction grating 337B of the grating region 335B are both 135 degrees. The azimuth angle of the diffraction grating 338 of the grating region 336 is 45 degrees. The horizontal (X direction) period C14 between the grating regions 335A of the first raw and the third raw is 36 μm. The horizontal (X direction) period C15 between the grating regions 336 of the second raw and the fourth raw is 41 μm. In addition, the horizontal (X direction) period C25 between the grating regions 335B is 41 μm. The vertical (Y direction) period C26 between the grating regions 335A is 72 μm. The vertical (Y direction) cycle space C16 between the grating region 335A and the grating region 336 is 36 μm.

Figure 31:
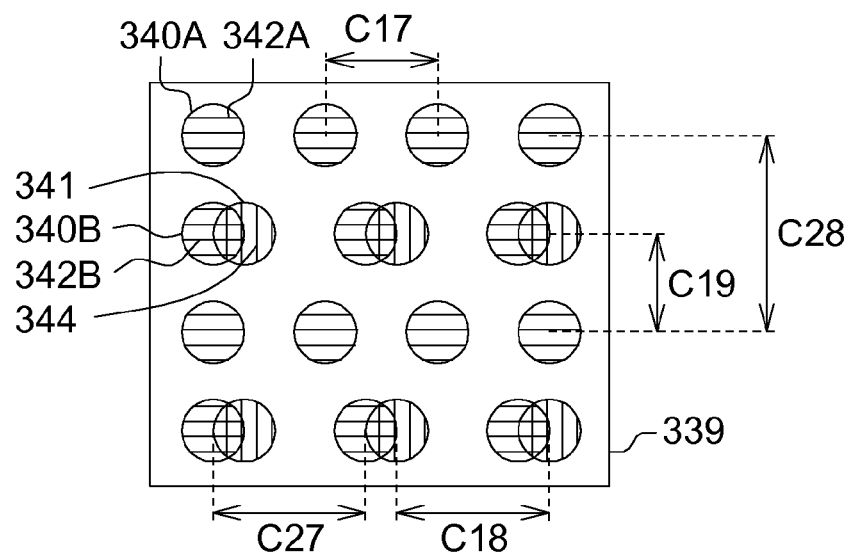

Referring to FIG. 31, the diffractive optical element 339 may be constituted by overlapping two diffractive optical elements. For example, one of the two diffractive optical elements has the grating region 340A and the grating region 340B, and the other of the two diffractive optical elements has the grating region 341. The azimuth angle of the diffraction grating 342A of the grating region 340A and the diffraction grating 342B of the grating region 340B are both 0 degrees. The azimuth angle of the diffraction grating 334 of the grating region 341 is 90 degrees. The horizontal (X direction) period C17 between the grating regions 340A of the first raw and the third raw is 36 μm. The horizontal (X direction) period C18 between the grating regions 341 of the second raw and the fourth raw is 41 μm. In addition, the horizontal (X direction) period C27 between the grating regions 340B is 41 μm. The vertical (Y direction) period C28 between the grating regions 340A is 72 μm. The vertical (Y direction) cycle space C19 between the grating region 340A and the grating region 341 is 36 μm.

Figure 32:
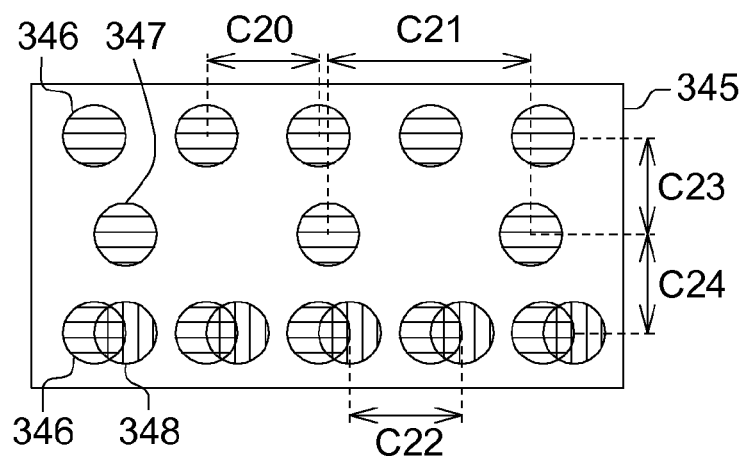

Referring to FIG. 32, the diffractive optical element 345 comprises the grating region 346, the grating region 347 and the grating region 348. In one embodiment, the horizontal (X direction) period C20 between the grating regions 346 is 26 μm. The horizontal (X direction) period C21 between the grating regions 347 is 48 μm. The horizontal (X direction) period C22 between the grating regions 348 is 26 μm. The vertical (Y direction) of the cycle space C23 between the grating region 346 and the grating region 347 is 41 μm. The vertical (Y direction) of the cycle space C24 between the grating region 347 and the grating region 348 is 41 μm.

In embodiments, the diffractive optical element is adjusted according to condition and effect for the display device.

Referring to FIG. 33, in embodiments, the display device 410 is a liquid crystal display device. The display device 410 comprises a backlight module 411, a liquid crystal panel 427, the polarizer 415 and the polarizer 425. The liquid crystal panel 427 is disposed on the backlight module 411. For example, the liquid crystal panel 427 comprises a thin film transistor substrate 416, a liquid crystal layer 418, a color filter substrate 421, the alignment film 417 and the alignment film 419. The alignment film 419 may be disposed on the color filter substrate 421. The alignment film 417 may be disposed on the thin film transistor substrate 416. The liquid crystal layer 418 may be disposed between the alignment film 417 and the alignment film 419. The polarizer 415 may be disposed between the thin film transistor substrate 416 and the backlight module 411 (on the light entering side of the liquid crystal panel 427). The polarizer 425 may be disposed on the color filter substrate 421 (the light emitting side of the liquid crystal panel 427). The diffractive optical element 402 may be disposed on the light emitting side of the polarizer 425. The diffractive optical element 402 is disposed by placing the wave crest structure facing the polarizer 425 or opposite to the polarizer 425. The diffractive optical element 425 may be used by stacking with other elements having different functions, such as an anti-reflection film, a scratch-resistant film, etc.

In some embodiments, the display device 410 is a twisted nematic (TN) liquid crystal display device. In this case, referring to FIG. 34, the azimuth angle of the aligning direction 426 of the alignment film 417 is arranged not parallel to the azimuth angle of the aligning direction 436 of the alignment film 419. The liquid crystal molecules 428 in the liquid crystal layer 418 are aligned by the alignment film 417 and the alignment film 419, and thus the liquid crystal molecules 428a (i.e. top layer liquid crystal molecule) adjacent to the alignment film 419 (i.e. top layer alignment film adjacent to the color filter substrate 421 in FIG. 33) and the liquid crystal molecule 428b (i.e. bottom layer liquid crystal molecule) adjacent to the alignment film 417 (i.e. bottom layer alignment film adjacent to the thin film transistor substrate 416 in FIG. 33 are aligned into a twisted structure and to have pretilt angles. One end of the liquid crystal molecule having the pretilt angle away from the alignment film is referred to as a head end, and the other end of the liquid crystal molecule is referred to as a tail end. For example, the alignment film 419 is used for aligning the top layer liquid crystal molecules 428a to have the pretilt angle. For example, the alignment film 417 is used for aligning the bottom layer liquid crystal molecules 428b to have the pretilt angle. The alignment film 417 and the alignment film 419 are arranged to the aligning directions of which not parallel to each other for aligning the liquid crystal molecules 428 therebetween to twist continuously into a twisted structure. In the twisted structure, the twist angle of the liquid crystal molecules 428 may be defined as an angle twist continuously from the head end of the bottom layer liquid crystal molecule 428b, through the middle layer liquid crystal molecule, to the tail end of the top layer liquid crystal molecule 428a.

Moreover, for conventional the twisted nematic (TN) liquid crystal display device, an optical characteristic of a viewing angle, ranged from the head end of the bottom layer liquid crystal molecule 428b twisted continuously, through the middle layer liquid crystal molecules, to the tail end of the liquid crystal molecules 428a, is not good and thus is usually defined as a look-down angle direction for a viewer. The above region for poor viewing angle can also be defined as some viewing angle directions for a viewer.

The azimuth angle of the liquid crystal molecule tilted relative to the substrate is defined as the tilt azimuth angle. For example, as the liquid crystal molecule is aligned or driven to have a specific included angle with the substrate, the tilted liquid crystal has the azimuth angle relative to the horizontal plane of the substrate. In other words, the included angle between the projection direction of the head end of the liquid crystal molecule on the horizontal plane of the substrate and the X-axis of the substrate is defined as liquid crystal tilt azimuth angle. For the liquid crystal display device is a multi-domain vertical aligned liquid crystal display device, it can be understood that various liquid crystal tilt azimuth angles can be generated at the same time.

In some embodiments, the diffractive optical element is designed according to the condition of the liquid crystal molecules 428 of the display device 410 (FIG. 34). Referring to FIG. 35, for example, the liquid crystal molecules 428a has the liquid crystal tilt azimuth angle Q1, such as 45 degrees. The liquid crystal molecule 428b has the liquid crystal tilt azimuth angle Q2, such as 315 degrees. In this case, the diffractive optical element having the diffraction gratings having the azimuth angles of 0 degree and 90 degrees may be used. In addition, the density (i.e. area percentage of grating occupying the diffractive optical element) of the diffraction grating having the grating direction having the azimuth angle of 0 degree is bigger than or equal to the density of the diffraction grating having the azimuth angle of 90 degrees. For example, diffractive optical element 32 as shown in FIG. 2 may be used. In other embodiments, the diffractive optical element having diffraction gratings having azimuth angles of 0 degree, 45 degrees and 135 degrees may be used. In addition, the density of the diffraction grating having the azimuth angle of 0 degree is bigger than or equal to the density of the diffraction gratings having the azimuth angles of 45 degrees and 135 degrees, respectively. For example, the diffractive optical element 82 as shown in FIG. 4 may be used. In one embodiment, the included angle between the grating direction of the first kind of the diffraction grating of the diffractive optical element and the tilt direction of the top layer liquid crystal molecule is 90±10 degrees or 0±10 degrees. The included angle between the grating direction of the second kind of the diffraction grating of the diffractive optical element and the tilt direction of the top layer liquid crystal molecule is 180±10 degrees or 90±10 degrees.

In one embodiment, as the included angle between the tilt directions of the top layer and the bottom layer liquid crystal molecules is 90 degrees, the included angle from the grating direction of the first kind of the diffraction grating of the diffractive optical element to the tilt direction of the top layer liquid crystal molecule is 0±20 degrees, preferably 0±10 degrees, and the included angle from the grating direction of the second kind of the diffraction grating of the diffractive optical element to the tilt direction of the top layer liquid crystal molecule is −90±20 degrees, preferably −90±10 degrees. In another embodiment, as the included angle between the tilt directions of the top layer and the bottom layer liquid crystal molecules is 90 degrees, the included angle from the grating direction of the first kind of the diffraction grating of the diffractive optical element to the tilt direction of the top layer liquid crystal molecule is 90±20 degrees, preferably 90±10 degrees, and the included angle from the grating direction of the second kind of the diffraction grating of the diffractive optical element to the tilt direction of the top layer liquid crystal molecule is 0±20 degrees, preferably 0±10 degrees. In yet another embodiment, as the included angle between the tilt directions of the top layer and the bottom layer liquid crystal molecules is 90 degrees, the included angle from the grating direction of the first kind of the diffraction grating of the diffractive optical element to the tilt direction of the top layer liquid crystal molecule is 45±60 degrees, preferably 45±20 degrees and more preferably 45±10 degrees, and the included angle from the grating direction of the second kind of the diffraction grating of the diffractive optical element to the tilt direction of the top layer liquid crystal molecule is −45±60 degrees, preferably −45±20 degrees and more preferably −45±10 degrees.

In one embodiment, the included angle from the grating direction of the first kind of the diffraction grating of the diffractive optical element to the tilt direction of the top layer liquid crystal molecule is 45±20 degrees, preferably 45±10 degrees, the included angle from the grating direction of the second kind of the diffraction grating of the diffractive optical element to the tilt direction of the top layer liquid crystal molecule is 0±20 degrees, preferably 0±10 degrees, and the included angle from the grating direction of the third kind of the diffraction grating of the diffractive optical element to the tilt direction of the top layer liquid crystal molecule is 90±20 degrees, preferably 90±10 degrees. In another embodiment, as the included angle between the tilt directions of the top layer and the bottom layer liquid crystal molecules is 90 degrees, the included angle from the grating direction of the first kind of the diffraction grating of the diffractive optical element to the tilt direction of the top layer liquid crystal molecule is −45±15 degrees, the included angle from the grating direction of the second kind of the diffraction grating of the diffractive optical element to the tilt direction of the top layer liquid crystal molecule is 90±15 degrees, and the included angle from the grating direction of the third kind of the diffraction grating of the diffractive optical element to the tilt direction of the top layer liquid crystal molecule is 0±15 degrees. In one embodiment, as the included angle between the tilt directions of the top layer and the bottom layer liquid crystal molecules is 90 degrees, the included angle from the grating direction of the first kind of the diffraction grating of the diffractive optical element to the tilt direction of the top layer liquid crystal molecule is 30±10 degrees, the included angle from the grating direction of the second kind of the diffraction grating of the diffractive optical element to the tilt direction of the top layer liquid crystal molecule is −15±10 degrees, and the included angle from the grating direction of the third kind of the diffraction grating of the diffractive optical element to the tilt direction of the top layer liquid crystal molecule is 75±10 degrees. In one embodiment, as the included angle between the tilt directions of the top layer and the bottom layer liquid crystal molecules is 90 degrees, the included angle between from grating direction of the first kind of the diffraction grating of the diffractive optical element to the tilt direction of the top layer liquid crystal molecule is 45±20 degrees, the included angle from the grating direction of the second kind of the diffraction grating of the diffractive optical element to the tilt direction of the top layer liquid crystal molecule is 0±20 degrees, and the included angle from the grating direction of the third kind of the diffraction grating of the diffractive optical element to the tilt direction of the top layer liquid crystal molecule is 90±20 degrees.

In some embodiments, the diffractive optical element may be designed according to the alignment film 417, the alignment film 419 of the display device 410 (FIG. 33). For example, in one embodiment, the azimuth angle of the aligning direction of the alignment film 419 is 45 degrees, and the azimuth angle of the aligning direction of the alignment film 417 is −45 degrees. In this case, the diffractive optical element having the diffraction gratings having the grating directions having the azimuth angles of 0 degree and 90 degrees may be used. In addition, in some embodiments, the density of the diffraction grating having the grating direction having the azimuth angle of 0 degree is bigger than or equal to the density of the diffraction grating having the grating direction having the azimuth angle of 90 degree. For example, the diffractive optical element 32 in FIG. 2 may be used. In other embodiments, the diffractive optical element having the diffraction gratings having the grating directions having the azimuth angles of 0 degree, 45 degrees and 135 degrees may be used. In addition, the density of the diffraction grating having the grating direction having the azimuth angle of 0 degree is bigger than or equal to the densities of the diffraction gratings having the grating directions having the azimuth angles of 45 degrees and 135 degrees, respectively. For example, the diffractive optical element 82 in FIG. 4 may be used.

In one embodiment, as the included angle between the aligning directions of the upper alignment film and the lower alignment film is 90 degrees, the included angle from the grating direction of the first kind of the diffraction grating of the diffractive optical element to the aligning direction of the top layer alignment film is 45±60 degrees, preferably 45±20 degrees and more preferably 45±10 degrees, and the included angle from the grating direction of the second kind of the diffraction grating of the diffractive optical element to the aligning direction of the top layer alignment film is −45±60 degrees, preferably −45±20 degrees and more preferably −45±10 degrees. In another embodiment, the included angle from the grating direction of the first kind of the diffraction grating of the diffractive optical element to the aligning direction of the top layer alignment film is 0±20 degrees, preferably 0±10 degrees, and the included angle from the grating direction of the second kind of the diffraction grating of the diffractive optical element to the aligning direction of the top layer alignment film is −90±20 degrees, preferably −90±10 degrees. In one embodiment, the included angle from the grating direction of the first kind of the diffraction grating of the diffractive optical element to the aligning direction of the top layer alignment film is +90±20 degrees, preferably +90±10 degrees, and the included angle from the grating direction of the second kind of the diffraction grating of the diffractive optical element to the aligning direction of the top layer alignment film is 0±20 degrees, preferably 0±10 degrees.

In one embodiment, as the included angle between the tilt directions of the top layer and the bottom layer liquid crystal molecules is 90 degrees, the included angle from the grating direction of the first kind of the diffraction grating of the diffractive optical element to the aligning direction of the top layer alignment film is −45±15 degrees, the included angle from the grating direction of the second kind of the diffraction grating of the diffractive optical element to the aligning direction of the top layer alignment film is 90±15 degrees, and the included angle from the grating direction of the third kind of the diffraction grating of the diffractive optical element to the aligning direction of the top layer alignment film is 0±15 degrees. In another embodiment, as the included angle between the tilt directions of the top layer and the bottom layer liquid crystal molecules is 90 degrees, the included angle from the grating direction of the first kind of the diffraction grating of the diffractive optical element to the aligning direction of the top layer alignment film is 30±10 degrees, the included angle from the grating direction of the second kind of the diffraction grating of the diffractive optical element to the aligning direction of the top layer alignment film is −15±10 degrees, and the included angle from the grating direction of the third kind of the diffraction grating of the diffractive optical element to the aligning direction of the top layer alignment film is 75±10 degrees. In one embodiment, the included angle from the grating direction of the first kind of the diffraction grating of the diffractive optical element to the aligning direction of the top layer alignment film is 45±20 degrees, the included angle from the grating direction of the second kind of the diffraction grating of the diffractive optical element to the aligning direction of the top layer alignment film is 0±20 degrees, and the included angle from the grating direction of the third kind of the diffraction grating of the diffractive optical element to the aligning direction of the top layer alignment film is 90±20 degrees.

In some embodiments, the diffractive optical element is designed according to the arrangement of the polarizer.

Figure 36:
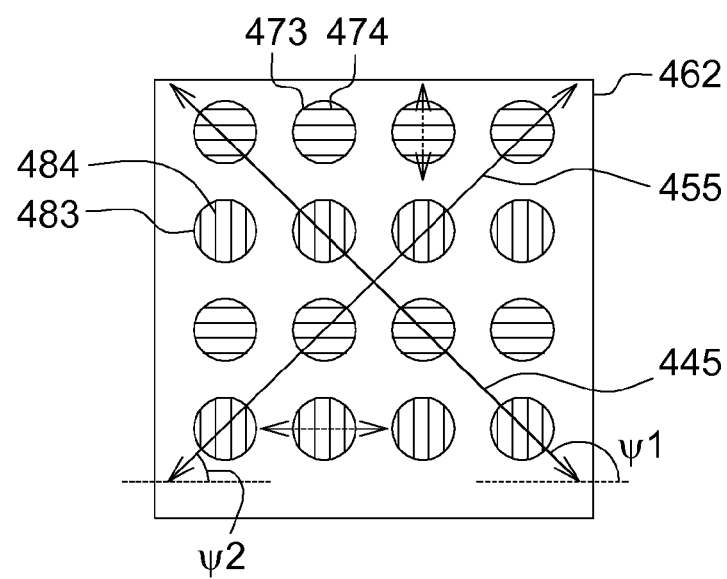
FIGS. 36-41 illustrate relations between the diffractive optical element and the polarizing direction of the polarizer.

Referring to FIG. 36, for example, the azimuth angle ψ1 of the polarizing direction 445 of the polarizer, such as the polarizer 425 in FIG. 33, on the light emitting side is 135 degrees, that is the azimuth angle of the transmission axis of the polarizer 425 is 135 degrees, or the azimuth angle of the absorption axis of the polarizer 425 is 45 degrees. The azimuth angle ψ2 of the polarizing direction 455 of the polarizer, such as the polarizer 415 in FIG. 33, adjacent to the backlight module is 45 degrees, that is the azimuth angle of the transmission axis of the polarizer is 45 degrees, or the azimuth angle of the absorption axis is 135 degrees. The diffractive optical element 462, similar to the diffractive optical element 32 in FIG. 2, has the grating region 473 and the grating region 483, respectively having the diffraction grating 474 having the grating direction having the azimuth angle of 0 degree and the diffraction grating 484 having the grating direction having the azimuth angle of 90 degrees. The density of the diffraction grating 473 is bigger than or equal to the density of the diffraction grating 483. In this case, the azimuth angle of the long axis direction of the row constituted by the grating regions 473 and the azimuth angle of the long axis direction of the row constituted by the grating regions 483 are 0 degree. The azimuth angle of the long axis direction of the column constituted by the grating regions 473 and the grating region 483 arranged in alternating fashion is 90 degrees.

Figure 37:
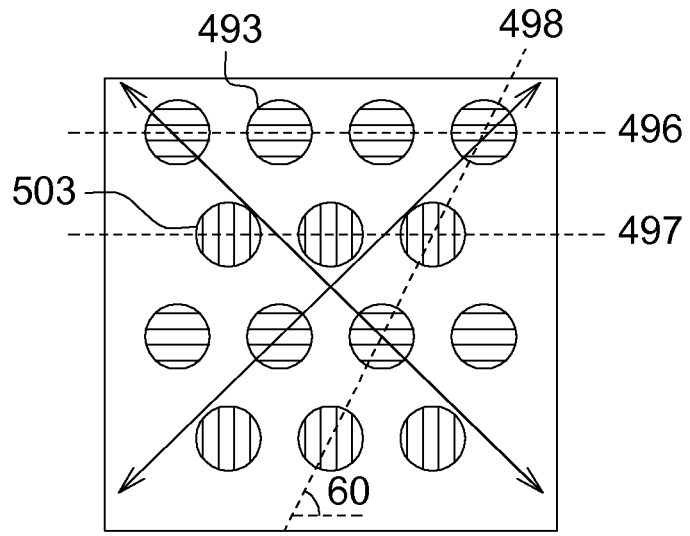
Figure 38:
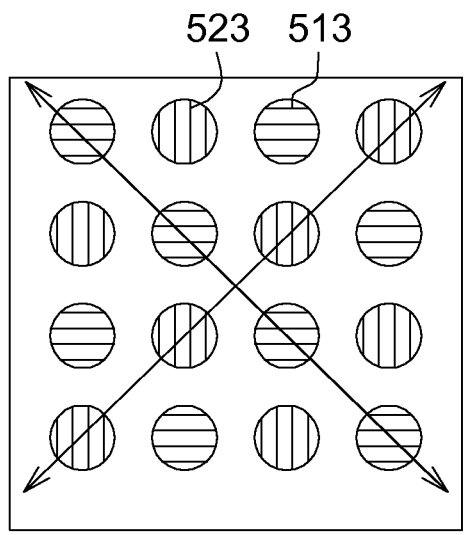

The embodiment as shown in FIG. 37 is different from the embodiment as shown in FIG. 36 in that the grating regions 493, similar with the grating region 473 in FIG. 36, and the grating region 503, similar with the grating region 483 in FIG. 36 are arranged in alternation. In this case, the azimuth angle of the long axis direction 496 of the row constituted by the grating regions 493 and the azimuth angle of the long axis direction 497 of the row constituted by the grating regions 503 are 0 degree. The azimuth angle of the long axis direction of the column constituted by the grating regions 493 and the grating region 503 arranged in alternating fashion is 60 degrees. The embodiment as shown in FIG. 38 is different from the embodiment as shown in FIG. 36 in that the grating regions 513, similar with the grating region 473 in FIG. 36, and the grating region 523, similar with the grating region 483 in FIG. 36 are arranged in alternation. In this case, the azimuth angle of the long axis direction of the row constituted by the grating regions 513 and the grating regions 523 arranged in alternation is 0 degree. The azimuth angle of the long axis direction of the column constituted by the grating regions 513 and the grating regions 523 arranged in alternation is 90 degrees.

Figure 39:
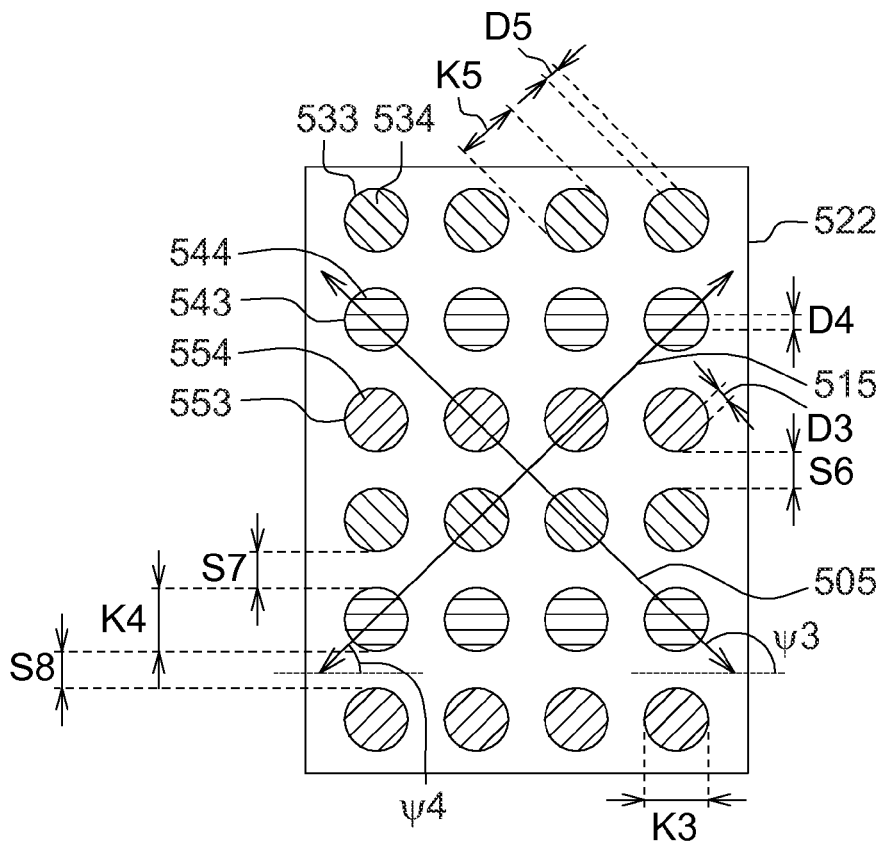

Referring to FIG. 39, the azimuth angle ψ3 of the polarizing direction 505 of the polarizer, such as the polarizer 425 in FIG. 33, on the light emitting side is 135 degrees, that is the azimuth angle of the transmission axis of the polarizer 425 is 135 degrees, or the azimuth angle of the absorption axis of the polarizer 425 is 45 degrees. The azimuth angle ψ4 of the polarizing direction 515 of the polarizer, such as the polarizer 415 in FIG. 33, adjacent to the backlight module is 45 degrees, that is the azimuth angle of the transmission axis of the polarizer 455 is 45 degrees, or the azimuth angle of the absorption axis of the polarizer 455 is 135 degrees. The diffractive optical element 522, similar with the diffractive optical element 82 in FIG. 4, has the grating region 533, the grating region 543 and the grating region 553, for example, respectively having the diffraction grating 534 having the grating direction having the azimuth angle of 135 degrees, the diffraction grating 544 having the grating direction having the azimuth angle of 0 degree, and the diffraction grating 554 having the grating direction having the azimuth angle of 45 degrees. In one embodiment, especially for the TN liquid crystal display device, the density of the diffraction grating 544 is gibber than or equal to the density of the diffraction grating 534 and the density of the diffraction grating 554 respectively.

Figure 40:
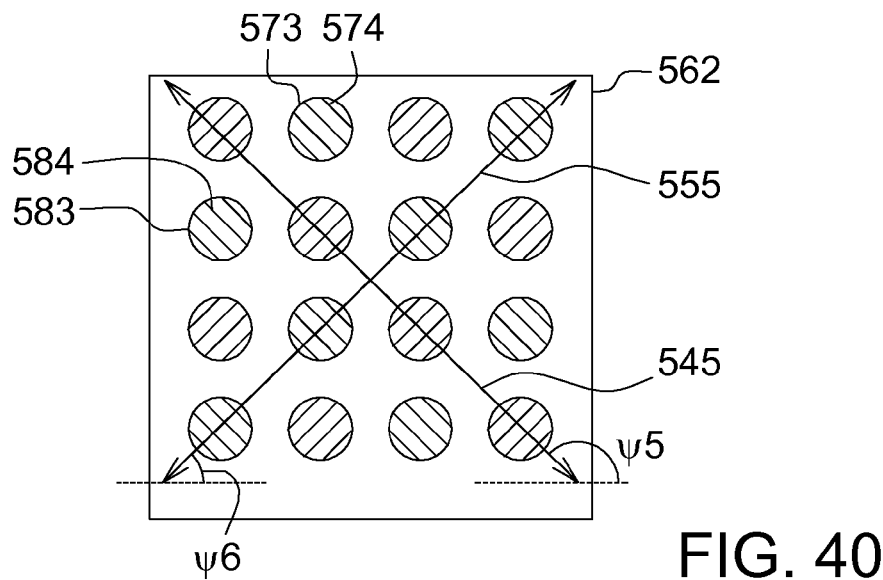

Referring to FIG. 40, the azimuth angle ψ5 of the polarizing direction 545 of the polarizer, such as the polarizer 425 in FIG. 33, on the light emitting side is 135 degrees, that is the azimuth angle of the transmission axis of the polarizer 425 is 135 degrees, or the azimuth angle of the absorption axis of the polarizer 425 is 45 degrees. The azimuth angle ψ6 of the polarizing direction 555 of the polarizer, such as the polarizer 415 in FIG. 33, adjacent to the backlight module is 45 degrees, that is the azimuth angle of the transmission axis of the polarizer 455 is 45 degrees, or the azimuth angle of the absorption axis of the polarizer 455 is 135 degrees. The diffractive optical element 562, similar with the diffractive optical element 182 in FIG. 8, has the grating region 573 and the grating region 583, respectively having the diffraction grating 574 having the grating direction having the azimuth angle of 135 degrees and the diffraction grating 584 having the grating direction having the azimuth angle of 45 degrees.

Figure 41:
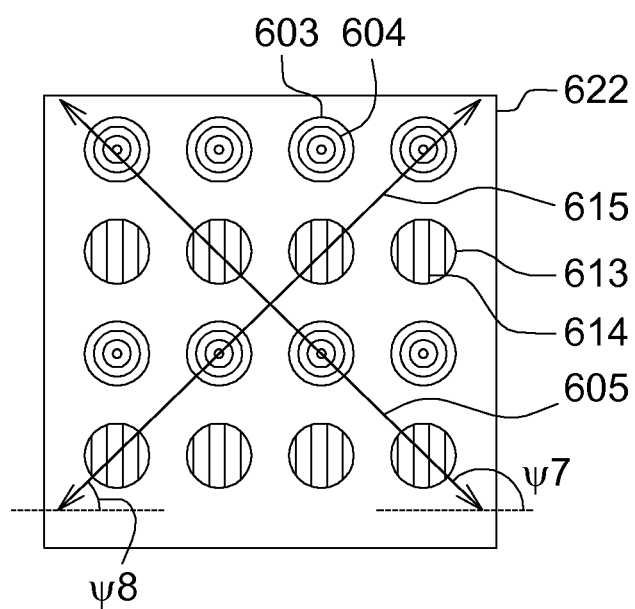

Referring to FIG. 41, the azimuth angle ψ7 of the polarizing direction 605 of the polarizer, such as the polarizer 425 in FIG. 33, on the light emitting side is 135 degrees. The azimuth angle ψ8 of the polarizing direction 615 of the polarizer, such as the polarizer 415 in FIG. 33, adjacent to the backlight module is 45 degrees. The diffractive optical element 622 for using is similar with the diffractive optical element 292 in FIG. 28, and has the grating region 603 and the grating region 613, respectively having the diffraction grating 604 having various grating directions and the diffraction grating 614 having the grating direction having the azimuth angle of 90 degrees.

In one embodiment, the included angle between the azimuth angles of the grating direction of the first kind of the diffraction grating of the diffractive optical element and the polarizing direction of the polarizer on the light emitting side is 135±20 degrees, and the included angle between the azimuth angles of the grating direction of the second kind of the diffraction grating of the diffractive optical element and the polarizing direction of the polarizer on the light emitting side is 45±20 degrees. In another embodiment, as the included angle between the polarizing direction of the polarizer on the light emitting side and the polarizing direction of the polarizer on the light entering side is 90 degrees and the azimuth angle of the polarizing direction of the polarizer on the light entering side is 135 degrees, the included angle from the grating direction of the first kind of the diffraction grating of the diffractive optical element to the polarizing direction of the polarizer on the light emitting side is 90±20 degrees, preferably 90±10 degrees, and the included angle from the grating direction of the second kind of the diffraction grating of the diffractive optical element to the polarizing direction of the polarizer on the light emitting side is 0±20 degrees, preferably 0±10 degrees. In another embodiment, as the included angle between the polarizing direction of the polarizer on the light emitting side and the polarizing direction of the polarizer on the light entering side is 90 degrees and the azimuth angle of the polarizing direction of the polarizer on the light entering side is 135 degrees, the included angle from the grating direction of the first kind of the diffraction grating of the diffractive optical element to the polarizing direction of the polarizer on the light emitting side is 180±20 degrees, preferably 180±10 degrees, and the included angle from the grating direction of the second kind of the diffraction grating of the diffractive optical element to the polarizing direction of the polarizer on the light emitting side is 90±20 degrees, preferably 90±10 degrees. In one embodiment, the included angle from the grating direction of the first kind of the diffraction grating of the diffractive optical element to the polarizing direction of the polarizer on the light emitting side is 45±15 degrees, the included angle from the grating direction of the second kind of the diffraction grating of the diffractive optical element to the polarizing direction of the polarizer on the light emitting side is 0±15 degrees, and the included angle from the grating direction of the third kind of the diffraction grating of the diffractive optical element to the polarizing direction of the polarizer on the light emitting side is 90±15 degrees. In another embodiment, the included angle from the grating direction of the first kind of the diffraction grating of the diffractive optical element to the polarizing direction of the polarizer on the light emitting side is 20±10 degrees, the included angle from the grating direction of the second kind of the diffraction grating of the diffractive optical element to the polarizing direction of the polarizer on the light emitting side is 75±10 degrees, and the included angle from the grating direction of the third kind of the diffraction grating of the diffractive optical element to the polarizing direction of the polarizer on the light emitting side is 165±10 degrees. In one embodiment, the included angle from the grating direction of the first kind of the diffraction grating of the diffractive optical element to the polarizing direction of the polarizer on the light emitting side is 135±20 degrees, the included angle from the grating direction of the second kind of the diffraction grating of the diffractive optical element to the polarizing direction of the polarizer on the light emitting side is 90±20 degrees, and the included angle from the grating direction of the third kind of the diffraction grating of the diffractive optical element to the polarizing direction of the polarizer on the light emitting side is 180±20 degrees.

In one embodiment, one experiment uses the Konica Minolta CS-2000 to measure the N101L6-L07 type liquid crystal display device having the diffractive optical element 212 (T=124 μm, W=117 μm, N=1 μm, M=7 μm) as shown in FIG. 20. The white state and the black state of the liquid crystal display device are measured for every 5 degrees of counter-clockwise rotating of the diffractive optical element 212. In addition, the contrast value (white state (255 gray levels) brightness/black state (0 gray level) brightness) and the normalization brightness of each gray level (brightness of each gray level/white state (255 gray levels) brightness) are calculated. Data are shown in table 1. The display device without using the diffractive optical element is one comparative example. Effect of adjusting the angle of the diffraction grating for the normalization brightness of the display device for the specific gray level is shown in table 2. The measuring method for the characteristics as shown in table 2 is adjusting the angle of the diffraction grating, and measuring the difference between the normalization brightness of the display device at the zenith angle of 0° and the brightness of the display device at the zenith angles of 45° or 60°, in the specific gray levels (224 gray levels, 232 gray levels). Each unit for the gray level reversion is 8 gray levels. The gray level reversion is happened as the difference between the next one unit of the gray level and the previous one unit of the gray level is negative. The normalization difference is the difference between the conditions in which the diffraction grating has the azimuth angle of 0 degrees and the diffraction grating has the azimuth angle of other rotating angles.

TABLE 1

| azimuth angle of diffraction grating | Central contrast |
|---|---|
| −85 | 734 |
| −80 | 761 |
| −75 | 786 |
| −70 | 827 |
| −65 | 864 |
| −60 | 879 |
| −55 | 882 |
| −50 | 873 |
| −45 | 845 |
| −40 | 827 |
| −35 | 781 |
| −30 | 736 |
| −25 | 687 |
| −20 | 662 |
| −15 | 653 |
| −10 | 653 |
| −5 | 660 |
| 0 | 681 |
| 5 | 762 |
| 10 | 764 |
| 15 | 790 |
| 20 | 809 |
| 25 | 828 |
| 30 | 856 |
| 35 | 865 |
| 40 | 885 |
| 45 | 896 |
| 50 | 905 |
| 55 | 915 |
| 60 | 906 |
| 65 | 889 |
| 70 | 857 |
| 75 | 812 |
| 80 | 764 |
| 85 | 734 |
| 90 | 722 |

The side viewing angle can be much improved due to the high density of 94%. However, since the single grating direction is used, the result is much affected by the rotating angle.

The contrast of the display apparatus is affected by adjusting the included angle between the diffraction grating direction and the polarizing direction of the polarizer.

In another embodiment, one experiment uses the Konica Minolta CS-2000 to measure the N101L6-L07 type liquid crystal display device (pixel of which is 800*600,126 PPI and the long side of the pixel of which is 203.2 μm, and the short side of the pixel of which is 67.73 μm) having the diffractive optical element 462 (S1=9 μm, S2=15 μm, S4=S5=13 μm, D1=D2=1 μm, K1=K2=28 μm) as shown in FIG. 36. Referring to FIG. 2, in other embodiments, the display apparatus (S1=9 μm, S2=15 μm, S3=9 μm, D1=D2=1 μm, S4=S5=41 μm, K1=K2=28 μm) may be used. The white state and the black state of the liquid crystal display device are measured for every 5 degrees of counter-clockwise rotating of the diffractive optical element 462. In addition, the contrast value (white state (255 gray levels) brightness/black state (0 gray levels) brightness) and the normalization brightness of each gray level (brightness of each gray level/white state (255 gray levels) brightness) are calculated. The influence of the diffraction grating angle to the contrast is shown in table 3 and FIG. 42. The display device without using the diffractive optical element is one comparative example. Effect of adjusting the angle of the diffraction grating to the normalization brightness of the display device for the specific gray level is shown in table 4, FIG. 43 and FIG. 44.

TABLE 3

| azimuth angle of diffraction grating 474 | Central contrast |
|---|---|
| −85 | 776 |
| −80 | 763 |
| −75 | 777 |
| −70 | 802 |
| −65 | 829 |
| −60 | 863 |
| −55 | 894 |
| −50 | 913 |
| −45 | 923 |
| −40 | 916 |
| −35 | 898 |
| −30 | 867 |
| −25 | 837 |
| −20 | 814 |
| −15 | 786 |
| −10 | 772 |
| −5 | 757 |

TABLE 2

| azimuth angle of diffraction grating | gray level for gray level reversion | Normalization brightness difference between θ of 45° and 0° (gray level 224) | normalization difference at θ of 45° | Normalization brightness difference between θ of 60° and 0° (gray level 232) | normalization difference at θ of 60° |
|---|---|---|---|---|---|
| comparative example | 64~152 | 56.4% | — | 58.9% | — |
| 0 | non | 18.9% | 100% | 11.8% | 100% |
| 10 | non | 21.9% | 116% | 16.6% | 140% |
| 20 | non | 24.0% | 127% | 20.0% | 169% |
| 30 | non | 28.8% | 153% | 25.8% | 218% |
| 40 | non | 35.8% | 190% | 34.5% | 292% |
| 45 | non | 40.3% | 214% | 39.3% | 333% |
| 50 | non | 43.3% | 229% | 41.3% | 350% |
| 60 | non | 47.3% | 251% | 44.6% | 378% |

TABLE 3-continued

| azimuth angle of diffraction grating 474 | Central contrast |
|---|---|
| 0 | 757 |
| 5 | 743 |
| 10 | 748 |
| 15 | 767 |
| 20 | 790 |
| 25 | 822 |
| 30 | 844 |
| 35 | 880 |
| 40 | 900 |
| 45 | 916 |
| 50 | 916 |
| 55 | 907 |
| 60 | 890 |
| 65 | 853 |
| 70 | 828 |
| 75 | 804 |
| 80 | 786 |
| 85 | 776 |
| 90 | 770 |

In FIG. 42 and table 3, 0 degree indicates that the azimuth angle of the diffraction grating 474 of the grating region 473 is 0 degree, and the azimuth angle of the diffraction grating 484 of the grating region 483 is 90 degrees, as shown in the arrangement condition in FIG. 36. In FIG. 42 and table 3, +5 degrees indicates that the azimuth angle of the diffraction grating 474 of the grating region 473 is +5 degree, and the azimuth angle of the diffraction grating 484 of the grating region 483 is +95 degrees. The azimuth angle ψ1 of the polarizing direction 445 of the polarizer on the light emitting side is fixed at 135 degrees, and thus the included angle from the polarizing direction of the polarizer on the light emitting side to the grating direction of the diffraction grating 484 is −130 degrees (or +50 degrees) and the included angle from the polarizing direction of the polarizer on the light emitting side to the grating direction of the diffraction grating 474 is −40 degrees (or +140 degrees). The angle of the counter-clockwise direction has a positive value, the angle of the clock-wise direction has a negative value, and so forth.

From table 3, it is found, for decreasing the influence to the contrast, the desired condition is that the azimuth angle of the diffraction grating 474 is about +45 degrees and the azimuth angle of the diffraction grating 484 is 135 degrees. For maintaining the influence to the contrast lower than 90%, the desired condition is that the azimuth angle of the diffraction grating 474 is 45±20 degrees and the azimuth angle of the diffraction grating 484 is 135±20 degrees. For making the influence to the contrast lower than 95%, the desired condition is that the azimuth angle of the diffraction grating 474 is 45±10 degrees and the azimuth angle of the diffraction grating 484 is 135±10 degrees. As the included angle between the tilt directions of the top layer liquid crystal molecule and the bottom layer liquid crystal molecule is 90 degrees, the desired condition is that the included angle from the grating direction of the diffraction grating 474 of the diffractive optical element to the tilt direction of the top layer liquid crystal molecule is 0±20 degrees, preferably 0±10 degrees, and the included angle from the grating direction of the diffraction grating 484 of the diffractive optical element to the tilt direction of the top layer liquid crystal molecule is −90±20 degrees, preferably −90±10 degrees. In addition, included angle from the grating direction of the diffraction grating 474 to the aligning direction of the first (top layer) alignment film, such as the alignment film 419 in FIG. 34, is 0±10 degrees, and the included angle from the grating direction of the diffraction grating 484 to the aligning direction of the first alignment film is −90±10 degrees. As the included angle between the polarizing direction of the polarizer of the light emitting side and the polarizing direction of the polarizer of the light entering side is 90 degrees, and the azimuth angle of the polarizing direction of the polarizer of the light emitting side is 135 degrees, the included angle from the grating direction of the diffraction grating 474 to the polarizing direction of the polarizer of the light emitting side is 90±10 degrees, and the included angle from the grating direction of the diffraction grating 484 to the polarizing direction of the polarizer of the light emitting side is 0±10 degrees.

From table 3, it is also found, for decreasing the influence to the contrast, the desired condition is that the azimuth angle of the diffraction grating 474 is about −45 degrees and the azimuth angle of the diffraction grating 484 is 45 degrees. For maintaining the influence to the contrast lower than 90%, the desired condition is that the azimuth angle of the diffraction grating 474 is −45±20 degrees and the azimuth angle of the diffraction grating 484 is 45±20 degrees. For making the influence to the contrast lower than 95%, the desired condition is that the azimuth angle of the diffraction grating 474 is −45±10 degrees and the azimuth angle of the diffraction grating 484 is 45±10 degrees. In this embodiment, the included angle from the grating direction of the diffraction grating 474 to the tilt direction of the top layer liquid crystal molecule, such as the top layer liquid crystal molecule 428a in FIG. 34 is 90±10 degrees and the included angle from the grating direction of the diffraction grating 484 to the tilt direction of the top layer liquid crystal molecule is 0±10 degrees. The included angle from the grating direction of the diffraction grating 474 to the aligning direction of the top layer alignment film is +90±10 degrees, and the included angle from the grating direction of the diffraction grating 484 to the aligning direction of the top layer alignment film is 0±10 degrees. As the included angle between the polarizing direction of the polarizer of the light emitting side and the polarizing direction of the polarizer of the light entering side is 90 degrees, and the azimuth angle of the polarizing direction of the polarizer of the light emitting side is 135 degrees, the included angle from the polarizing direction of the polarizer of the light emitting side to the grating direction of the diffraction grating 474 is 180±10 degrees, and the included angle from the polarizing direction of the polarizer of the light emitting side to the grating direction of the diffraction grating 484 is 90±10 degrees.

TABLE 4

| azimuth angle of diffraction grating 474 | gray level for gray level reversion | Normalization brightness difference between θ of 45° and 0° (gray level 224) | normalization difference at θ of 45° | Normalization brightness difference between θ of 60° and 0° (gray level 232) | normalization difference at θ of 60° |
|---|---|---|---|---|---|
| comparative example | 64~152 | 56.4% | — | 58.9% | — |
| 0 | non | 41.3% | 100.00% | 26.8% | 100.00% |

TABLE 4-continued

| azimuth angle of diffraction grating 474 | gray level for gray level reversion | Normalization brightness difference between θ of 45° and 0° (gray level 224) | normalization difference at θ of 45° | Normalization brightness difference between θ of 60° and 0° (gray level 232) | normalization difference at θ of 60° |
|---|---|---|---|---|---|
| 10 | non | 42.9% | 103.79% | 28.5% | 106.40% |
| 20 | non | 43.8% | 105.98% | 31.1% | 116.26% |
| 30 | non | 53.2% | 128.77% | 49.1% | 183.48% |
| 40 | non | 53.2% | 128.77% | 49.1% | 183.48% |
| 45 | non | 45.1% | 109.14% | 50.0% | 186.76% |
| 50 | non | 44.9% | 108.64% | 48.7% | 182.08% |
| 60 | non | 42.9% | 103.85% | 45.3% | 169.28% |

The measuring method for the characteristics as shown in table 4 is adjusting the angle of the diffraction grating, and measuring the difference between the normalization brightness of the display device at the zenith angle of 0° and the brightness of the display device at the zenith angles of 45° or 60°, in the specific gray levels (224 gray level, 232 gray level). Each unit for the gray level reversion is 8 gray levels. The gray level reversion is happened as the difference between the next one unit of the gray level and the previous one unit of the gray level is negative. The normalization difference is the difference between the conditions in which the diffraction grating has the azimuth angle of 0 degree and the diffraction grating has the azimuth angle of other rotating angles.

In comparative example, at an observation angle of (θ,ψ)= (45,270), the difference value between the normalization brightness at the zenith angle θ=45 and the normalization brightness at the zenith angle θ=0 has the maximum value (56.41%) at the 224 gray level. Therefore, the observation at the zenith angle θ=45 is based on the 224 gray level. With increase of the deviation of the azimuth angle of the diffraction grating 474 of the diffractive optical element 462 from 0 degree increases, the difference value between the normalization brightness values at 224 gray level of θ=45 and θ=0 increases. The difference value has the maximum (53.2%) as the deviation reaches about 30~40 degrees, which is smaller than comparative example (58.9%). The difference value gets smaller than the maximum value after the deviation of about 40 degrees.

In comparative example, at an observation angle of (θ,ψ)= (60,270), the difference value between the normalization brightness at the zenith angle θ=60 and the normalization brightness at the zenith angle θ=0 has the maximum value (58.92%) at the 232 gray level. With increase of the deviation of the azimuth angle of the diffraction grating 474 of the diffractive optical element 462 from 0 degree increases, the difference value between the normalization brightness values at 232 gray level of θ=60 and θ=0 increases. The difference value has the maximum (50.0%) as the deviation reaches about 45 degrees, which is smaller than comparative example (58.9%). By comparing table 2 with table 3, it is found that the influence from rotating the diffractive optical element 462 is smaller than the influence from rotating the diffractive optical element 212.

As a whole, even effect of the diffractive optical element 462 deviated about 40~45 degrees is poor, it is still better then that of comparative example. Therefore, the diffractive optical element 462 can be used in a deviation range of 0~60 degrees.

In this embodiment, for improving the gray level reversion, the azimuth angle of the diffraction grating 474 is set at 0±60 degrees, and the azimuth angle of the diffraction grating 484 is set at 90±60 degrees. For further improving the look-down angle characteristic, the azimuth angle of the diffraction grating 474 is set at 0±20 degrees and the azimuth angle of the diffraction grating 484 is set at 90±20 degrees. The included angle from the grating direction of the diffraction grating 474 to the polarizing direction of the polarizer of the light emitting side is 135±20 degrees, and the included angle from the grating direction of the diffraction grating 484 to the polarizing direction of the polarizer of the light emitting side is 45±20 degrees. The included angle from the grating direction of the diffraction grating 474 to the tilt direction of the top layer liquid crystal molecule is 45±10 degrees, and the included angle from the grating direction of the diffraction grating 484 to the tilt direction of the top layer liquid crystal molecule is −45±10 degrees. The included angle from the grating direction of the diffraction grating 474 to the aligning direction of the top layer alignment film is 45±10 degrees, and the included angle from the grating direction of the diffraction grating 484 to the aligning direction of the top layer alignment film is −45±10 degrees.

In yet another embodiment, one experiment uses the Konica Minolta CS-2000 to measure the N101L6-L07 type liquid crystal display device having the diffractive optical element 522 (S6=1 µm, S7=1 µm, S8=1 µm, D3=D4=D5=1 µm, S9=S10=S11=1 µm, K3=K4=K5=28 µm) as shown in FIG. 39. The white state and the black state of the liquid crystal display device are measured for every 5 degrees of counter-clockwise rotating of the diffractive optical element 522. In addition, the contrast value (white state (255 gray levels) brightness/black state (0 gray levels) brightness) and the normalization brightness of each gray level (brightness of each gray level/white state (255 gray levels) brightness) are calculated. Experiment results are shown in FIG. 45 and FIG. 46. In FIG. 45 and FIG. 46, 0 degree indicates that the azimuth angle of the diffraction grating 534 of the grating region 533 is 135 degrees, the azimuth angle of the diffraction grating 544 of the grating region 543 is 0 degree, and the azimuth angle of the diffraction grating 554 of the grating region 553 is 45 degrees. 24.4% of the area of the diffractive optical element 522 is occupied by the area of the grating region 533. 24.4% of the area of the diffractive optical element 522 is occupied by the area of the grating region 543. In addition, 24.4% of the area of the diffractive optical element 522 is occupied by the area of the grating region 553. +5 degrees indicates that the azimuth angle of the diffraction grating 534 of the grating region 533 is 140 degrees, the azimuth angle of the diffraction grating 544 of the grating region 543 is 5 degrees, and the azimuth angle of the diffraction grating 554 of the grating region 553 is 50 degrees. The azimuth angle ψ3 of the polarizing direction 505 of the polarizer of the light emitting side is fixed at 135, and thus the included angle from the grating direction of the diffraction grating 534 to the polarizing direction of the polarizer of the light emitting side is −5 degrees (or +175 degrees), the included angle from the grating direction of the diffraction grating 544 to the polarizing direction 505 of the polarizer of the light emitting side is −50 degrees (or 130 degrees), and the included angle from the grating direction of the diffraction grating 554 to the polarizing direction 505 of the polarizer of the light emitting side is −90 degrees (or +85 degrees). The angle of the counter-clockwise direction has a positive value, the angle of the clock-wise direction has a negative value, and so forth. The influence of the diffraction grating angle to the contrast for the display device is shown in table 5, FIG. 45 and FIG. 46. The display device without using the diffractive optical element is one comparative example. Effect of adjusting the angle of the diffraction grating to the normalization brightness of the display device for the specific gray level is shown in table 6, FIG. 47 and FIG. 48.

TABLE 5

| azimuth angle of diffraction grating 544 | Central contrast |
|---|---|
| −85 | 654 |
| −80 | 651 |
| −75 | 630 |
| −70 | 611 |
| −65 | 594 |
| −60 | 587 |
| −55 | 581 |
| −50 | 582 |
| −45 | 583 |
| −40 | 584 |
| −35 | 585 |
| −30 | 586 |
| −25 | 582 |
| −20 | 591 |
| −15 | 592 |
| −10 | 602 |
| −5 | 604 |
| 0 | 612 |
| 5 | 630 |
| 10 | 634 |
| 15 | 634 |
| 20 | 633 |
| 25 | 628 |
| 30 | 617 |
| 35 | 613 |
| 40 | 608 |
| 45 | 604 |
| 50 | 596 |
| 55 | 598 |
| 60 | 607 |
| 65 | 617 |
| 70 | 624 |
| 75 | 638 |
| 80 | 642 |
| 85 | 645 |
| 90 | 659 |

Referring to table 5, from experimental results, it is found that the influence for the contrast is low as the azimuth angle of the diffraction grating 534 is 45±15 degrees, the azimuth angle of the diffraction grating 544 is 90±15 degrees, and the azimuth angle of the diffraction grating 554 is 135±15 degrees. In this embodiment, as the included angle between the polarizing direction 505 of the polarizer of the light emitting side and the polarizing direction 515 of the polarizer of the light entering side is 90 degrees and the azimuth angle ψ3 of the polarizing direction 505 of the polarizer of the light entering side is 135 degrees, the included angle from the polarizing direction 505 of the polarizer of the light emitting side to the grating direction of the diffraction grating 534 is 90±15 degrees, the included angle from the grating direction of the diffraction grating 544 to the polarizing direction 505 of the polarizer of the light emitting side is 45±15 degrees, and the included angle from the grating direction of the diffraction grating 554 to the polarizing direction 505 of the polarizer of the light emitting side is 0±15 degrees. The included angle from the grating direction of the diffraction grating 544 to the tilt direction of the top layer liquid crystal molecule is −45±15 degrees, the included angle from the grating direction of the diffraction grating 554 to the tilt direction of the top layer liquid crystal molecule is −90±15 degrees, and the included angle from the grating direction of the diffraction grating 534 to the tilt direction of the top layer liquid crystal molecule is 0±15 degrees. The included angle from the grating direction of the diffraction grating 544 to the aligning direction of the top layer alignment film is −45±15 degrees, the included angle from the grating direction of the diffraction grating 554 to the aligning direction of the top layer alignment film is −90±15 degrees, and the included angle from the grating direction of the diffraction grating 534 to the aligning direction of the top layer alignment film is 0±15 degrees.

In one embodiment, the influence for the contrast is low as the azimuth angle of the diffraction grating 534 is −30±10 degrees, the azimuth angle of the diffraction grating 544 is 15±10 degrees, and the azimuth angle of the diffraction grating 554 is 60±10 degrees. As the included angle between the polarizing direction 505 of the polarizer of the light emitting side and the polarizing direction 515 of the polarizer of the light entering side is 90 degrees and the azimuth angle ψ3 of the polarizing direction 505 of the polarizer of the light entering side is 135 degrees, the included angle from the grating direction of the diffraction grating 534 to the polarizing direction 505 of the polarizer of the light emitting side is 165±10 degrees, the included angle from the grating direction of the diffraction grating 544 to the polarizing direction 505 of the polarizer of the light emitting side is 120±10 degrees, and the included angle from the grating direction of the diffraction grating 554 to the polarizing direction 505 of the polarizer of the light emitting side is 75±10 degrees. The included angle from the grating direction of the diffraction grating 544 to the tilt direction of the top layer liquid crystal molecule is 30±10 degrees, the included angle from the grating direction of the diffraction grating 554 to the tilt direction of the top layer liquid crystal molecule is −15±10 degrees, and the included angle from the grating direction of the diffraction grating 534 to the tilt direction of the top layer liquid crystal molecule is 75±10 degrees. The included angle from the grating direction of the diffraction grating 544 to the aligning direction of the top layer alignment film is 30±10 degrees, the included angle from the grating direction of the diffraction grating 554 to the aligning direction of the top layer alignment film is −15±10 degrees, and the included angle from the grating direction of the diffraction grating 534 to the aligning direction of the top layer alignment film is 75±10 degrees.

TABLE 6

| azimuth angle of diffraction grating 544 | θ = 45° range for gray level reversion | Normalization brightness difference between θ of 45° and 0° (gray level 224) | normalization difference at θ of 45° | Normalization brightness difference between θ of 60° and 0° (gray level 232) | normalization difference at θ of 60° |
|---|---|---|---|---|---|
| comparative example | 64~152 | 56.4% | — | 58.9% | — |

TABLE 6-continued

| azimuth angle of diffraction grating 544 | θ = 45° range for gray level reversion | Normalization brightness difference between θ of 45° and 0° (gray level 224) | normalization difference at θ of 45° | Normalization brightness difference between θ of 60° and 0° (gray level 232) | normalization difference at θ of 60° |
|---|---|---|---|---|---|
| 0 | Non | 37.68% | 100.00% | 31.49% | 100.00% |
| 10 | Non | 35.98% | 95.50% | 29.46% | 93.57% |
| 20 | Non | 37.44% | 99.36% | 33.52% | 106.47% |
| 30 | Non | 40.10% | 106.43% | 32.97% | 104.69% |
| 40 | Non | 41.50% | 110.13% | 34.47% | 109.47% |
| 45 | Non | 43.46% | 115.34% | 34.69% | 100.65% |
| 50 | Non | 41.85% | 111.08% | 39.71% | 126.11% |
| 60 | Non | 43.58% | 115.68% | 36.88% | 117.12% |

Referring to table 6, in comparative example, at an observation angle of (θ,ψ)=(45,270), the difference value between the normalization brightness at the zenith angle θ=45 and the normalization brightness at the zenith angle θ=0 has the maximum value (56.41%) at the 224 gray level. Therefore, the observation at the zenith angle θ=45 is based on the 224 gray level. With increase of the deviation of the azimuth angle of the diffraction grating 544 of the diffractive optical element 522 from 0 degree increases, the difference value between the normalization brightness values at 224 gray level of θ=45 and θ=0 increases. The difference value has the maximum (43.58%) as the deviation reaches about 60 degrees, which is smaller than comparative example (56.4%). By comparing table 6 with table 1, it is found that the influence from rotating the diffractive optical element 522 is smaller than the influence from rotating the diffractive optical element 212.

In comparative example, at an observation angle of (θ,ψ)=(60,270), the difference value between the normalization brightness at the zenith angle θ=60 and the normalization brightness at the zenith angle θ=0 has the maximum value (58.92%) at the 232 gray level. At the observation angle of (θ,ψ)=(60,270), with increase of the deviation of the azimuth angle of the diffraction grating 544 of the diffractive optical element 522 from 0 degree increases, the difference value between the normalization brightness values at 232 gray level of θ=60 and θ=0 increases. The difference value has the maximum (39.71%) as the deviation reaches about 50 degrees, which is smaller than comparative example (58.9%). The difference value gets smaller than the maximum value after the deviation of about 50 degrees.

As a whole, even effect of the diffractive optical element 522 deviated about 60 degrees is poor, it is still better then that of comparative example. Therefore, the diffractive optical element 522 can be used in a deviation range of 0~60 degrees. In this embodiment, for improving the gray level reversion, the azimuth angle of the diffraction grating 534 is set at 135±40 degrees, the azimuth angle of the diffraction grating 544 is set at 0±40 degrees, and the azimuth angle of the diffraction grating 554 is set at 45±40 degrees. For further improving the look-down angle characteristic, the azimuth angle of the diffraction grating 534 is set at 135±20 degrees, the azimuth angle of the diffraction grating 544 is set at 0±20 degrees, and the azimuth angle of the diffraction grating 554 is set at 45±20 degrees. The included angle from the grating direction of the diffraction grating 534 to the polarizing direction of the polarizer of the light emitting side is 180±20 degrees, the included angle from the grating direction of the diffraction grating 544 to the polarizing direction of the polarizer of the light emitting side is 135±20 degrees, and the included angle from the grating direction of the diffraction grating 554 to the polarizing direction of the polarizer of the light emitting side is 90±20 degrees. In this embodiment, the included angle from the grating direction of the diffraction grating 544 to the tilt direction of the top layer liquid crystal molecule (such as the liquid crystal molecule 428a in FIG. 34) is 45±20 degrees, the included angle from the grating direction of the diffraction grating 554 to the tilt direction of the top layer liquid crystal molecule is 0±20 degrees, and the included angle from the grating direction of the diffraction grating 534 to the tilt direction of the top layer liquid crystal molecule is 90±20 degrees. The included angle from the grating direction of the diffraction grating 544 to the aligning direction of the top layer alignment film is 45±20 degrees, the included angle from the grating direction of the diffraction grating 554 to the aligning direction of the top layer alignment film is 0±20 degrees, and the included angle from the grating direction of the diffraction grating 534 to the aligning direction of the top layer alignment film is 90±20 degrees.

In some embodiments, the diffractive optical element is designed according to condition of the display device.

Referring to FIG. 49, the display device has a pixel 630. The pixel 630 comprises a pixel unit region 637, a pixel unit region 638 and a pixel unit region 639. For example, each of the pixel unit region 637, the pixel unit region 638 and the pixel unit region 639 has a long pixel side 647 and a short pixel side 648 adjacent to each other. The pixel unit region 637, the pixel unit region 638 and the pixel unit region 639 may be a red pixel unit region, a green pixel unit region, and a blue pixel unit region, respectively. In other embodiments, the pixel unit region may be not limited to three regions, and may be constituted by various colors. Generally, the length J of the short pixel side 648 is one-third as big as the length L of the long pixel side 647. In some embodiments, the pixel 630 may be for the single color for forming a black-and-white display device, and in this case, each of the pixel unit regions may have the pixel sides having equal lengths (not shown).

Referring to FIG. 49, in this embodiment, the long axis direction of the row constituted by the grating regions 653 and the long axis direction of the row constituted by the grating regions 663 are both substantially parallel to the direction of the short pixel side 648. The long axis direction of the column constituted by the grating regions 653 and the grating regions 663 arranged in alternation is substantially parallel to the direction of the long pixel side 647. In addition, in the row constituted by the grating regions 653, the period Px between the grating region 653 is smaller than or equal to the length J of the short pixel side 648. In the row constituted by the grating regions 663, the period Gx of the grating regions 663 is also smaller than or equal to the length J of the short pixel side 648. Therefore, light for each of the pixel can get effect from at least one grating region 653 and at least one grating region 663. In some embodiments, in condition of fixing the grating structure unit and the grating density in the specific single pixel unit, the period Px of the grating region 653 or the period Gx of the grating region 663 is not necessary to be smaller than or equal to the length J of the short pixel side 648, and thus can be bigger than the length J. For example, in the display device having the red, green and blue pixel unit regions arranged along the short pixel side cyclically, for the red pixel unit regions, the red pixels in one column have gratings, and the left (right) most next red pixels in column have no gratings or have gratings of other kinds of arrangement.

Referring to FIG. 49, in some embodiments, in the column constituted by the grating regions 653 and the grating regions 663, the period Py of the grating regions 653 is smaller than or equal to the length L of the long pixel side 647. In the column constituted by the grating regions 663, the period Gy of the grating regions 663 is also smaller than or equal to the length L of the long pixel side 647. Therefore, light for each of the pixel can get effect from at least one grating region 653 and at least one grating region 663. In some embodiments, in condition of fixing the grating structure unit and the grating density in the specific single pixel unit, the period Py of the grating region 653 or the period Gy of the grating region 663 is not necessary to be smaller than or equal to the length L of the short pixel side 647, and thus can be bigger than the length L. For example, along the long pixel side, one row has gratings, and the left (right) most next row has no gratings or has gratings of other kinds of arrangement.

The embodiment shown in FIG. 50 is different from the embodiment shown in FIG. 49 in that the long axis of the line constituted by the grating regions 673 and the grating regions 683 is not parallel to the short pixel side 668 and the long pixel side 667. In embodiments, the included angle g between the long axis of the line constituted by the grating regions 673 and the grating regions 683 arranged in alternation and the short pixel side 668 is bigger than 0 degree and smaller than 90 degrees. In addition, the grating axes of the grating region 673 and the grating region 683 follow the included angle g. In the period of the line constituted by the grating regions 673 and the grating regions 683 arranged in alternation, the period F between the grating region 673 and the grating region 683 is smaller than or equal to J/cos(g). J indicates the length of the short pixel side 668. The long axis of the line constituted by the grating regions 673 and the short pixel side 668 has the included angle 90-g therebetween. The long axis of the line constituted by the grating regions 683 and the short pixel side 668 has the included angle 90-g therebetween. In the line constituted by the grating regions 673 and the line constituted by the grating regions 683, the period V between the grating regions 673 and the period Y between the grating regions 683 are respectively smaller than or equal to J/cos(90-g). This structure arrangement can be used for resolving moiré issue, or adjusting the main diffraction direction of the diffractive element relative to the direction of the display device without changing the exiting whole arrangement.

Referring to FIG. 50, the compensate direction shifts by the angle g as the grating axes of the grating region 673 and the grating region 683 is shifted by the angle g with the whole arrangement. In this case, for maintaining the main diffraction direction as not rotating the angle g, the grating region 673 and the grating region 683 may be made without changing the grating axis directions of which as shown in FIG. 51.

Figure 53:
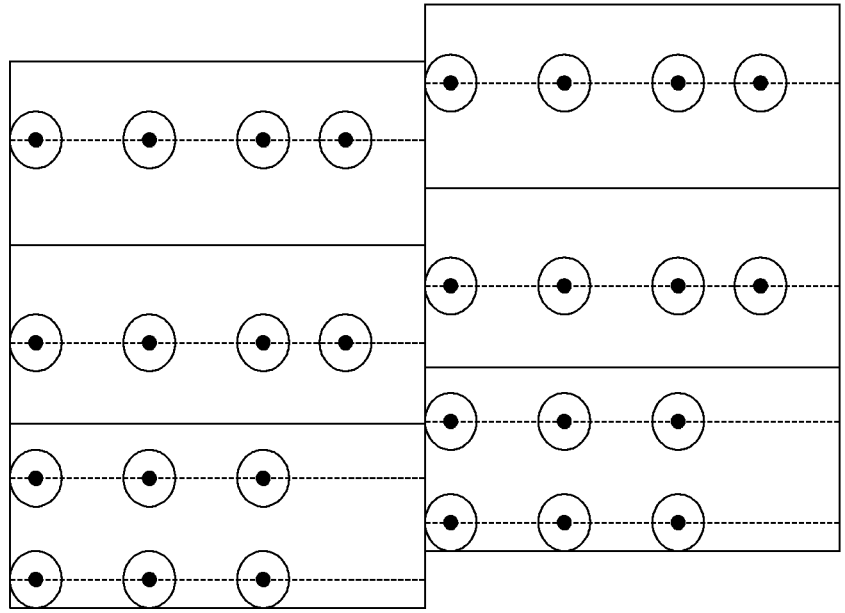
FIGS. 52-59 illustrate the arrangements of the grating region and the pixel unit region.
Figure 52:
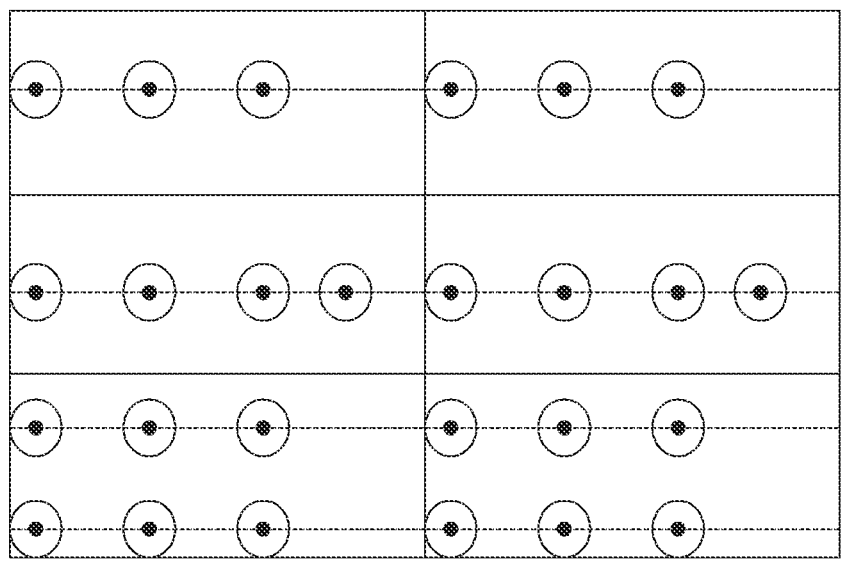
Figure 55:
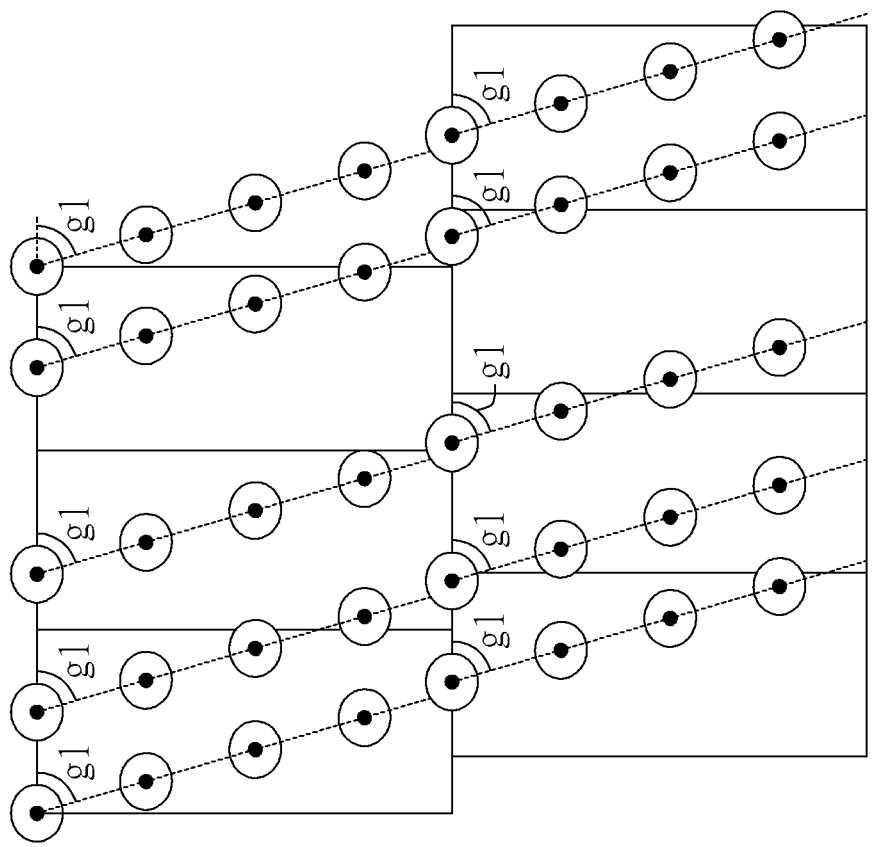
Figure 54:
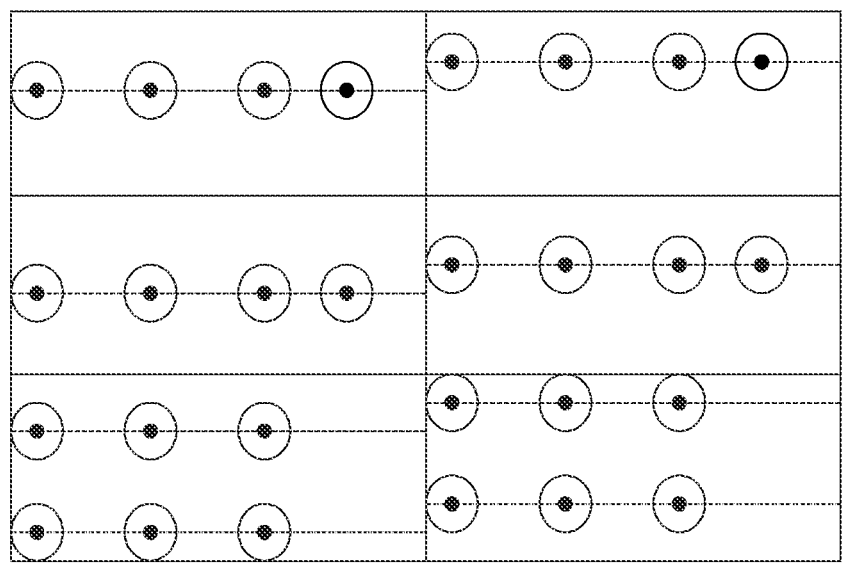
Figure 57:
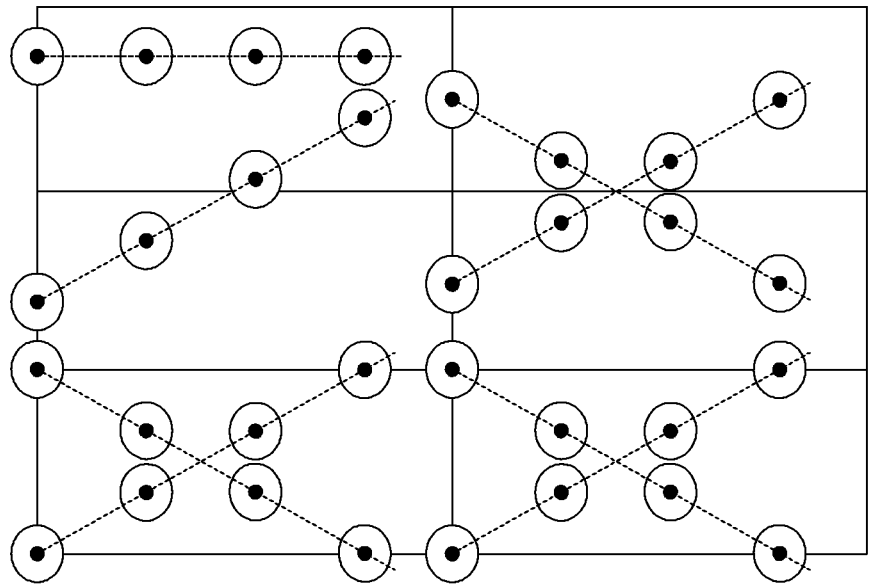
Figure 56:
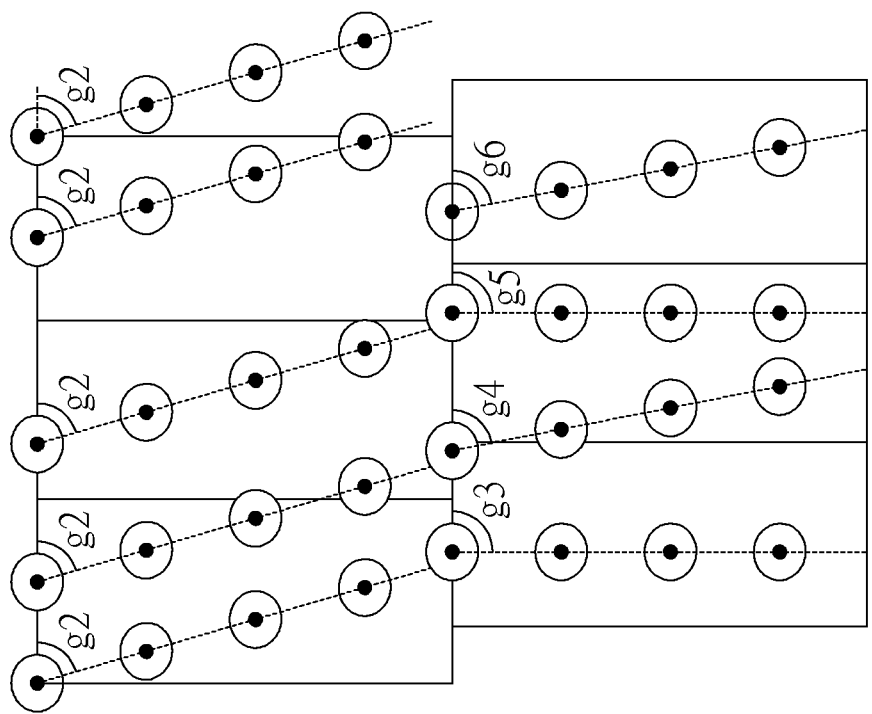
Figure 58:
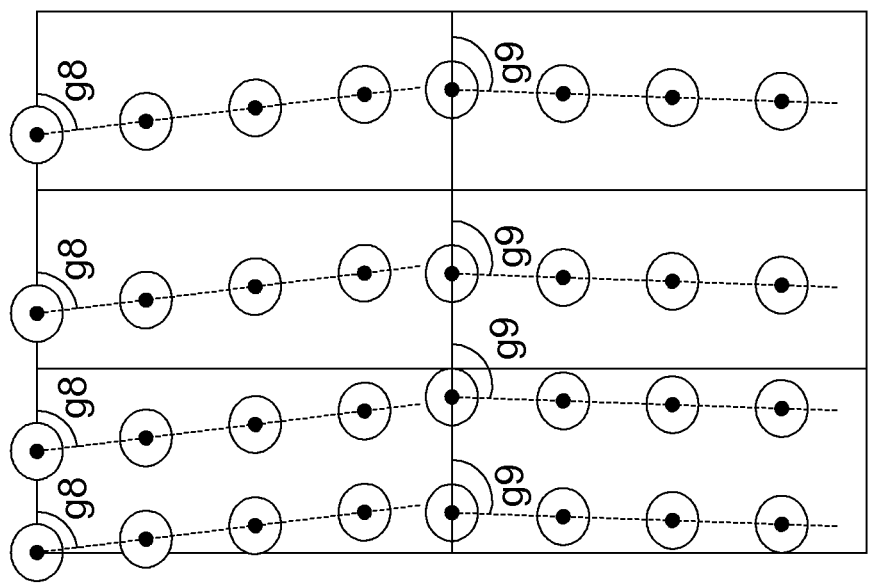

The arrangement of the grating region can be adjusted according to actual demands. Referring to FIG. 52 and FIG. 53, for example, the grating region is arranged according to the corresponding pixel unit region. For example, the grating regions in the pixel unit region of the same color or the same structure, such as the single unit having three red, green and blue pixels or the single unit having multiple red, green and blue pixels, have the same arrangement method. Optionally, the grating regions in the pixel unit region of different colors or different structures, such as the single unit having three red, green and blue pixels or the single unit having multiple red, green and blue pixels, have different arrangement methods. For example, for the front view, the chromatic color of the white gray level is blue. For compensating chromatic difference of the white gray level from the front view (observation angle of θ=0) of the display device, the grating density in the blue pixel unit region may be higher than the grating density in the red and green pixel unit region. In one embodiment as shown in FIG. 54, the pixel unit regions of the same color is designed to have the lines constituted by the same grating region. In addition, the location of the lines arranged in the pixels may be changed. As such, the optical moiré issue that would happen easily in the grating of the period structure can be avoided. In FIG. 55, the included angle between the line constituted by the grating regions and the pixel side may be adjusted properly, such as the same included angle g1 in this embodiment. Referring to FIG. 56, in this embodiment, the lines constituted by the grating regions corresponding to the upper pixels and the pixel side have the same included angle g2 therebetween. The lines constituted by the grating regions corresponding to the lower upper pixels and the pixel side have various included angles g3, g4, g5, g6 therebetween. Every pixel has the grating regions of substantially the same area by the method. Referring to FIG. 57, the lines constituted by the grating regions and the pixel side may have different included angles therebetween. Referring to FIG. 58, in this embodiment, the lines constituted by the grating regions corresponding to the upper pixels and the pixel side have the same included angle g8 therebetween. The lines constituted by the grating regions corresponding to the lower pixels and the pixel side have the same included angle g9 therebetween. The included angle g8 and the included angle g9 are respectively smaller than or bigger than 90 degrees. The embodiment shown in FIG. 59 may be a variation of the embodiment shown in FIG. 54. The embodiment shown in FIG. 59 is different from the embodiment shown in FIG. 54 in that, in FIG. 59, some grating regions are deviated from the long axis of the line. The deviation degree is limited to a range in the period between the lines, so that the pixels of the same characteristic, such as the same color or the same LC mode, etc. respectively have the grating region of the same area equally. The RGB pixel of each group has the grating arrangement of the grating regions having the periods Λ1, . . . Λn therebetween. In some embodiments, the RGB pixels of different groups adjacent to each other may be designed to have different grating arrangements. The design can be adjusted as long as the period between the RGB pixels and the cycle structure of the grating can be reconstituted.

The line constituted by the grating regions and the pixel side may be designed to have different included angles therebetween for decreasing the moiré issue.

In embodiments, one experiment uses the Konica Minolta CS-2000 to measure the N101L6-L07 type liquid crystal display device having the diffractive optical element 462 (S1=9 μm, S2=15 μm, S3=9 μm, D1=D2=1 μm, K1=K2=28 μm, referring to FIG. 2) as shown in FIG. 36. The white state and the black state of the 8"TN panel are measured. In addition, the contrast values of the 8"TN panel are calculated. In this embodiment, the condition of fixing S5=13 μm and adjusting the period between the grating regions, such as the gap distance=20 (S4=−8), 23 (S4=−5), 26 (S4=−2), 29 (S4=1), 32 (S4=4), 35 (S4=7), 38 (S4=10), 41 (S4=13), 44 μm (S4=16), between the centers of the circles is used. The experiment results are shown in table 7.

TABLE 7

| Period of grating | white state | black state | contrast | Area of first grating | Area of second grating |
|---|---|---|---|---|---|
| 20 | 126 | 0.24 | 533 | 38.5% | 18.8% |
| 23 | 111 | 0.24 | 455 | 33.5% | 18.8% |
| 26 | 116 | 0.25 | 475 | 29.6% | 18.8% |
| 29 | 138 | 0.23 | 592 | 26.5% | 18.8% |
| 32 | 146 | 0.23 | 632 | 24.1% | 18.8% |
| 35 | 172 | 0.22 | 785 | 22.0% | 18.8% |
| 38 | 165 | 0.22 | 742 | 20.3% | 18.8% |
| 41 | 184 | 0.22 | 843 | 18.8% | 18.8% |
| 44 | 202 | 0.21 | 975 | 17.5% | 18.8% |

The ratio of the area of the grating region to the area of the diffractive optical element can be obtained by calculating. For example, in one embodiment, it is found that as the gap distance between the grating regions is 26 μm-41 μm, the contrast (equal to the brightness in the white state/the brightness in the black state) or the brightness in the white state of the display apparatus (comprising the TN type liquid crystal display device) would change with the change of the gap distance between the grating regions with a linear relation roughly, as shown in FIG. 60. In the condition of S5+K2=S4+K1=41 μm, since the diffraction efficiency shows a substantial symmetrical result and thus can be used as a standard, the structure variation can be supposed correspondingly for increasing or decreasing the diffraction efficiency roughly. From the result shown in FIG. 60, it is obtained from calculations that as the gap distance between the grating regions (having the structure as shown in FIG. 2 is changed by 1 μm, the diffraction efficiency of the display apparatus would change by about 2.33%, that is, the normalization brightness would change by 2.3%. Therefore, for increasing/decreasing the whole oblique diffraction effect, the gap distance between the grating regions can be increase or decreased from 41 μm linearly. Similarly, the contrast may be driven out from the similar method. For example, for increasing the whole oblique diffraction effect (or decreasing the normalization brightness) by 10%, the gap distance between the grating regions should be creased from 41 μm by 2.1 μm. For example, for increasing the oblique diffraction by 10%, the gap distance between the grating regions should be 38.9 μm. For increasing the oblique diffraction by 20%, the gap distance between the grating regions should be 36.7 μm, and so forth. On the contrary, for increasing the normalization brightness (or decreasing the oblique diffraction effect) by 10%, the gap distance between the grating regions should be increased by 2.1 μm from 41 μm. For example, for increasing the normalization brightness by 10%, the gap distance between the grating regions should be 43.1 μm. For increasing the normalization brightness by 20%, the gap distance between the grating regions should be 45.3 μm, and so forth.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display apparatus, comprising:
a liquid crystal display device comprising:
a backlight module; and
a liquid crystal panel comprising a first substrate, a second substrate and a liquid crystal layer, wherein the liquid crystal layer is disposed between the first substrate and the second substrate;
a first polarizer disposed on the first substrate;
a second polarizer disposed between the second substrate and the backlight module, wherein polarizing directions of the first polarizer and the second polarizer have different azimuth angles; and
a diffractive optical element disposed on a light emitting side of the first polarizer and having a first diffraction grating and a second diffraction grating, wherein grating directions of the first diffraction grating and the second diffraction grating have different azimuth angles, an included angle from the grating direction of the first diffraction grating to the polarizing direction of the first polarizer is 0±20 degrees, and an included angle from the grating direction of the second diffraction grating to the polarizing direction of the first polarizer is 90±20 degrees.

2. The display apparatus according to claim 1, wherein an included angle from the grating direction of the first diffraction grating to the polarizing direction of the first polarizer is 0±15 degrees, an included angle from the grating direction of the second diffraction grating to the polarizing direction of the first polarizer is 90±15 degrees.

3. The display apparatus according to claim 1, wherein an included angle from the grating direction of the first diffraction grating to the polarizing direction of the first polarizer is 0±10 degrees, an included angle from the grating direction of the second diffraction grating to the polarizing direction of the first polarizer is 90±10 degrees.

4. The display apparatus according to claim 1, wherein the diffractive optical element further comprises a third diffraction grating, wherein an azimuth angle of the third diffraction grating is different from the azimuth angles of the first diffraction grating and the second diffraction grating.

5. The display apparatus according to claim 4, wherein an included angle from the grating direction of the third diffraction grating to the polarizing direction of the first polarizer is 135±20 degrees.

6. The display apparatus according to claim 4, wherein an included angle from the grating direction of the third diffraction grating to the polarizing direction of the first polarizer is 135±15 degrees.

7. The display apparatus according to claim 4, wherein an included angle from the grating direction of the first diffraction grating to the polarizing direction of the first polarizer is 0±15 degrees, an included angle from the grating direction of the second diffraction grating to the polarizing direction of the first polarizer is 90±15 degrees, an included angle from the grating direction of the third diffraction grating to the polarizing direction of the first polarizer is 135±15 degrees.

8. The display apparatus according to claim 1, wherein an included angle between the polarizing direction of the first polarizer and the polarizing direction of the second polarizer is 90 degrees.

9. The display apparatus according to claim 1, wherein the azimuth angle of the polarizing direction of the first polarizer measured from a horizontal axis is 135 degrees.

10. A display apparatus, comprising:
a liquid crystal display device for displaying an image and comprising:
a backlight module; and
a liquid crystal panel disposed on the backlight module and comprising:
a first substrate;
a first alignment film disposed on the first substrate;
a second substrate;
a second alignment film disposed on the second substrate, wherein aligning directions of the first alignment film and the second alignment film have different azimuth angles; and
a liquid crystal layer disposed between the first alignment film and the second alignment film; and
a diffractive optical element disposed on a light emitting side of the liquid crystal display device and comprising a first diffraction grating and a second diffraction grating, wherein an azimuth angle of a grating direction of the first diffraction grating is different from an azimuth angle of a grating direction of the second diffraction grating, an included angle from the grating direction of the first diffraction grating to the aligning direction of the first alignment film is 90±20 degrees, an included angle from the grating direction of the second diffraction grating to the aligning direction of the first alignment film is 0±20 degrees.

11. The display apparatus according to claim 10, wherein an included angle from the grating direction of the first diffraction grating to the aligning direction of the first alignment film is 90±15 degrees, an included angle from the grating direction of the second diffraction grating to the aligning direction of the first alignment film is 0±15 degrees.

12. The display apparatus according to claim 10, wherein an included angle from the grating direction of the first diffraction grating to the aligning direction of the first alignment film is 90±10 degrees, an included angle from the grating direction of the second diffraction grating to the aligning direction of the first alignment film is 0±10 degrees.

13. The display apparatus according to claim 10, wherein the diffractive optical element further comprises a third diffraction grating, an azimuth angle of the third diffraction grating is different from the azimuth angles of the first diffraction grating and the second diffraction grating.

14. The display apparatus according to claim 13, wherein an included angle from the grating direction of the third diffraction grating to the aligning direction of the first alignment film is 45±20 degrees.

15. The display apparatus according to claim 13, wherein an included angle from the grating direction of the third diffraction grating to the aligning direction of the first alignment film is 45±15 degrees.

16. The display apparatus according to claim 13, wherein an included angle from the grating direction of the first diffraction grating to the aligning direction of the first alignment film is 90±10 degrees, an included angle from the grating direction of the second diffraction grating to the aligning direction of the first alignment film is 0±10 degrees, an included angle from the grating direction of the third diffraction grating to the aligning direction of the first alignment film is 45±10 degrees.

17. The display apparatus according to claim 10, wherein an included angle between the aligning direction of the first alignment film and the aligning direction of the second alignment film is 90 degrees.

18. A liquid crystal display device for displaying an image, comprising:
a liquid crystal panel comprising:
a first substrate;
a second substrate; and
a liquid crystal layer disposed between the first substrate and the second substrate, wherein the liquid crystal layer comprises liquid crystal molecules, at least one of the liquid crystal molecules adjacent to the first substrate has a first liquid crystal tilt direction, at least one of the liquid crystal molecules adjacent to the second substrate has a second liquid crystal tilt direction, an azimuth angle of the first liquid crystal tilt direction is different from an azimuth angle of the second liquid crystal tilt direction; and
a diffractive optical element disposed on a light emitting side of the liquid crystal panel and comprising a first diffraction grating and a second diffraction grating, wherein an azimuth angle of a grating direction of the first diffraction grating is different from an azimuth angle of a grating direction of the second diffraction grating, an included angle from the grating direction of the first diffraction grating to the first liquid crystal tilt direction is 90±20 degrees, an included angle from the grating direction of the second diffraction grating to the first liquid crystal tilt direction is 0±20 degrees.

19. The display apparatus according to claim 18, wherein an included angle from the grating direction of the first diffraction grating to the first liquid crystal tilt direction is 90±15 degrees, an included angle from the grating direction of the second diffraction grating to the first liquid crystal tilt direction is 0±15 degrees.

20. The display apparatus according to claim 18, wherein an included angle from the grating direction of the first diffraction grating to the first liquid crystal tilt direction is 90±10 degrees, an included angle from the grating direction of the second diffraction grating to the first liquid crystal tilt direction is 0±10 degrees.

21. The display apparatus according to claim 18, wherein the diffractive optical element further comprises a third diffraction grating, an azimuth angle of the third diffraction grating is different from the azimuth angles of the first diffraction grating and the second diffraction grating.

22. The display apparatus according to claim 21, wherein included angle from the grating direction of the third diffraction grating to the first liquid crystal tilt direction is 45±20 degrees.

23. The display apparatus according to claim 21, wherein an included angle from the grating direction of the third diffraction grating to the first liquid crystal tilt direction is 45±15 degrees.

24. The display apparatus according to claim 21, wherein an included angle from the grating direction of the first diffraction grating to the first liquid crystal tilt direction is 90±10 degrees, an included angle from the grating direction of the second diffraction grating to the first liquid crystal tilt direction is 0±10 degrees, an included angle from the grating direction of the third diffraction grating to the first liquid crystal tilt direction is 45±10 degrees.

25. The display apparatus according to claim 18, wherein an included angle between the first liquid crystal tilt direction and the second liquid crystal tilt direction is 90 degrees.

26. The display apparatus according to claim 10, wherein the azimuth angle of the aligning direction of the first alignment film measured from a horizontal axis is 45 degrees.

27. The display apparatus according to claim 18, wherein the azimuth angle of the first liquid crystal tilt direction measured from a horizontal axis is 45 degrees.

* * * * *